United States Patent [19]
Yagi et al.

[11] Patent Number: 5,757,758
[45] Date of Patent: May 26, 1998

[54] OPTICAL PICKUP APPARATUS OBJECTIVE LENS AND CONVERGING OPTICAL SYSTEM FOR OPTICAL PICKUP AND OPTICAL DISK APPARATUS

[75] Inventors: Katsuya Yagi; Hiroyuki Yamazaki; Masaya Kobayashi, all of Hachioji, Japan

[73] Assignee: Konica Corporation, Tokyo, Japan

[21] Appl. No.: 761,892

[22] Filed: Dec. 9, 1996

[30] Foreign Application Priority Data

Dec. 19, 1995 [JP] Japan ................ 7-330539
Feb. 7, 1996 [JP] Japan ................ 8-021225
Jun. 18, 1996 [JP] Japan ................ 8-156831

[51] Int. Cl.$^6$ ........................... G11B 7/00
[52] U.S. Cl. ....................... 369/112; 369/44.12
[58] Field of Search ............. 369/112, 110, 369/109, 44.11, 44.14, 44.12

[56] References Cited

U.S. PATENT DOCUMENTS 4,449,792  5/1984  Arai et al. .
5,161,063  11/1992  Krill et al. .

FOREIGN PATENT DOCUMENTS 0 537 904  4/1993  European Pat. Off. .
0 610 055  10/1994  European Pat. Off. .
0 731 457  11/1996  European Pat. Off. .
2 188 167  9/1987  United Kingdom .

*Primary Examiner*—Muhammad N. Edun
*Attorney, Agent, or Firm*—Finnegan, Henderson, Farabow, Garrett & Dunner, L.L.P.

[57] ABSTRACT

An optical pickup apparatus includes: a laser light source; a light converging optical system for converging a light beam emitted from the laser light source onto a first information recording surface of a first optical information recording medium having a thickness t1 of a transparent substrate, or a second information recording surface of a second optical information recording medium having a thickness t2 of a transparent substrate. The light converging optical system has a best fit wavefront aberration of 0.07 λ rms or less at a numerical aperture of NA1 when the thickness t1 of the transparent substrate is used, and has a best fit wavefront aberration of 0.07 λ rms or less at a numerical aperture of NA2 when the thickness t2 of the transparent substrate is used, where NA1 represents a numerical aperture on a side of the first optical information recording medium in the light converging optical system when the light beam emitted from the laser light source is converged as a light spot to be read out, NA2 represents an effective numerical aperture on a side of the second optical information recording medium in the light converging optical system when the light beam emitted from the laser light source is converged as a light spot to be read out, and λ represents a wavelength of the light beam emergent from the laser light source. The optical pickup apparatus further includes a light detector for detecting light reflected from the first or second information recording surface.

37 Claims, 30 Drawing Sheets

V - SHAPED BENT PORTION

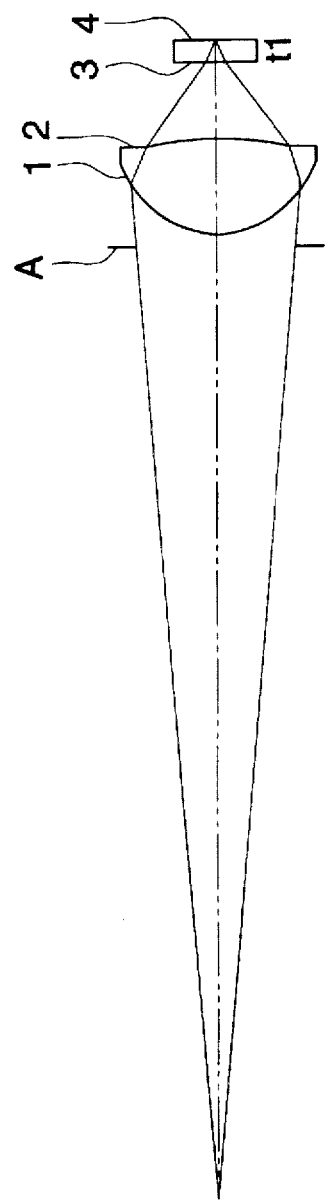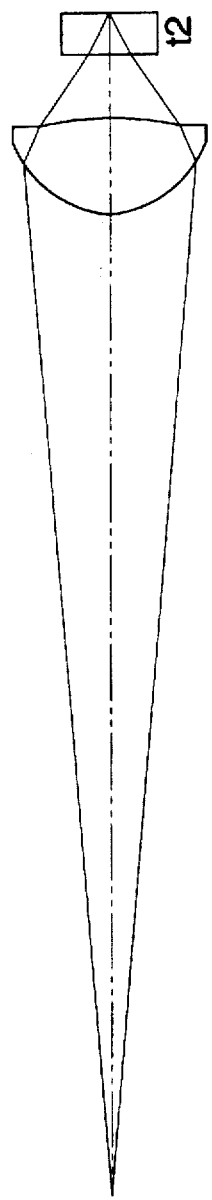
FIG. 18 (a)
FIG. 18 (b)

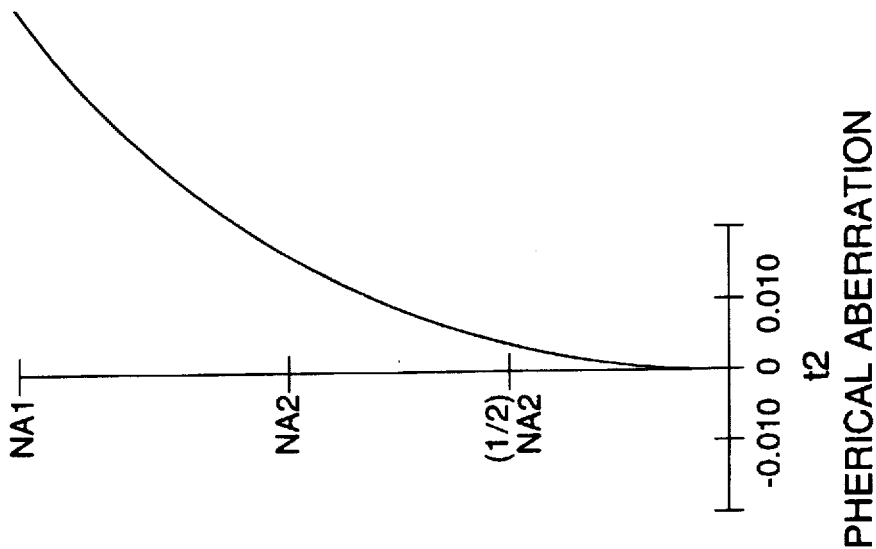
FIG. 20 (a)
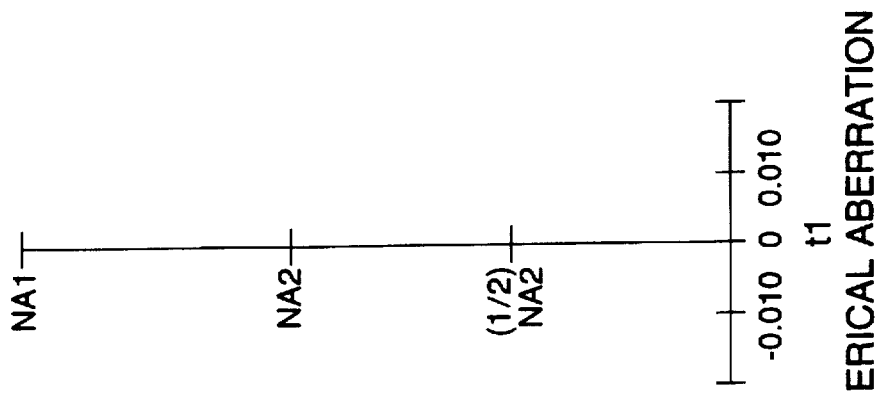
FIG. 20 (b) PRIOR ART

PRIOR ART

OPTICAL PICKUP APPARATUS OBJECTIVE LENS AND CONVERGING OPTICAL SYSTEM FOR OPTICAL PICKUP AND OPTICAL DISK APPARATUS

BACKGROUND OF THE INVENTION

The present invention relates to an optical pickup apparatus for recording and/or reproducing optical information by irradiating a light beam such as a laser beam on an optical information recording medium, an objective lens for optical pickup, a converging optical system for optical pickup and to an optical disk apparatus.

A prior art related to the invention will be explained as follows.

Incidentally, in the following explanation, an optical disk is used as an example of the optical information recording medium.

Recently, as shorter wavelength red semiconductor lasers ($\lambda$=635–690 nm) have been put to practical use, there has been advanced development of a DVD (digital video disk) having an optical disk size which is mostly the same as a conventional CD (compact disk) and larger capacity. In this optical disk of a DVD system, numerical aperture NA of an objective lens for optical pickup is made to be 0.6 and a thickness of a disk substrate is made to be 0.6 mm which is a half of that of a conventional CD, both for larger capacity. In addition, a tracking pitch and a shortest pit are made higher in density to be 0.74 µm and 0.4 µm respectively which are smaller respectively than halves of the tracking pitch of 1.6 µm and shortest pit of 0.86 µm both are for the CD.

An optical disk apparatus for reproducing the DVD mentioned above which is also capable of reproducing a conventional CD is demanded for practical use of software property.

FIG. 1 is a diagram of an optical pickup apparatus used for an optical disk apparatus which has so far been considered.

In FIG. 1, a light beam emitted from laser light source 1 passes through hologram beam splitter 2 and then enters collimator lens 3 to turn into a collimated light beam which is limited to a prescribed light beam by aperture-stop 5 and enters objective lens 6. When the collimated light beam enters this objective lens 6, the objective lens 6 forms an light spot on information recording surface 8 through substrate 7 having a certain prescribed thickness (t=0.6 mm in this case).

A light beam modulated by information pit and reflected on information recording surface 8 passes through objective lens 6 and collimator lens 3 to return to hologram beam splitter 2 where the light beam is separated from a path of light emitted from laser light source 1 and enters photodetector 9. The photo-detector 9 is a multi-split PIN photodiode which outputs from its element an electric current that is proportional to the intensity of an incident light beam and sends the electric current to an unillustrated detecting circuit where information signal, focus error signal and track error signal are generated. Based on the focus error signals and track error signals, a 2-dimensional actuator (not shown) controls objective lens 6 in the focusing direction and tracking direction, and thereby makes a position of a light spot to be on an information track constantly.

In such optical pickup apparatus, large NA (for example, NA 0.6) is used for making a light spot converged by objective lens 6 small. Therefore, when a thickness of a substrate 7 placed in such a converged light beam is deviated from a prescribed thickness, a serious spherical aberration is caused.

FIG. 2 is a diagram showing the relation between a substrate thickness and wavefront aberration.

For example, when a substrate thickness is changed for an objective lens optimized under the conditions of NA 0.6, wavelength of 635 nm for a laser beam emitted from a laser light source, a substrate thickness of 0.6 mm and of substrate refractive index of 1.58, a wavefront aberration increases by about 0.01 $\lambda$ rms for a deviation of 0.01 mm in the substrate thickness as shown in FIG. 2. A symbol rms means a root mean square of a wavefront aberration. The wavefront aberration in this case means one wherein there is added a defocus which achieves the best value of the wavefront aberration (i.e., best fit wavefront aberration). Therefore, when a thickness of a transparent thickness is deviated by ±0.07 mm, it causes an aberration of 0.07 $\lambda$ rms which means that the aberration reaches Marechal criterion that is a standard with which reading can be conducted normally.

Therefore, when reproducing an optical disk having a 1.2 mm-thick substrate in place of an optical disk having a 0.6 mm-thick substrate, reproduction is made after switching to objective lens 61 which is designed so that an light spot may be obtained through a 1.2 mm-thick substrate at an actuator section and to aperture-stop 51.

Alternatively, the following is also considered. Two optical pickup apparatus respectively used for a 0.6 mm thickness substrate and for a 1.2 mm thickness substrate are provided in a single optical disk apparatus.

Further, the following is also considered. A hologram is provided in the optical pickup apparatus, and a 0-order light and a 1st-order light which are transmitted through the hologram are respectively used as optical spots corresponding to the 0.6 mm thickness substrate and the 1.2 mm thickness substrate, and these optical spots are converged on the information recording surface.

As described above, when there is used an apparatus in which two objective lenses respectively corresponding to 0.6 mm and 1.2 mm thickness substrates are provided, or when there are used two optical pickup apparatus for the 0.6 mm and for 1.2 mm thickness substrates are used both for reproducing an information recording medium having different thickness substrates in one optical disk apparatus, it is impossible to make an optical pickup apparatus and an optical disk apparatus to be compact in size and low in cost.

In the method in which a hologram is provided in an optical path of a converging optical system of the optical pickup apparatus, and a 0-order light and a 1st-order light which are transmitted through the hologram, are respectively used as optical spots corresponding to the 0.6 mm thickness substrate and the 1.2 mm thickness substrate, and these optical spots are converged onto the information recording surface, since two light beams are always sent to the information recording surface of the optical disk, one light beam turns into undesired light for information reading out when information reading is carried out by the optical spot of the other light beam, resulting in an increase of noise. Further, since the laser beam intensity is used under divided condition, the S/N ratio is decreased by a corresponding decrease of the amount of light returning to an optical detector, or the life of the laser beam is shortened as the amount of light is increased. Further, in the method in which recording is carried out, since a loss of light emission is increased, a higher output laser apparatus is required, resulting in a further increase of cost.

SUMMARY OF THE INVENTION

The invention has been achieved for solving the problems mentioned above. Namely, an object of the invention is to attain that optical disks each having a different substrate thickness can be reproduced by an optical pickup apparatus, and to provide a simply structured and compact optical pickup apparatus, an objective lens for optical pickup, a converging optical system for optical pickup and an optical disk apparatus.

The object of the invention can be attained by the following structures. An optical pickup apparatus includes the following structural elements:

a) a laser light source;

b) a light converging optical system for converging a light beam emitted from aforesaid laser light source on the first information recording surface of the first optical information recording medium having a t1-thick transparent substrate or on the second information recording surface of the second optical information recording medium having a transparent substrate with a thickness of t2 that is greater than t1, and in the light converging optical system, the best fit wavefront aberration through the t1-thick transparent substrate at NA1 is not more than 0.07·λ rms and that through the t2-thick transparent substrate at NA2 is not more than 0.07·λ rms, wherein NA1 is a numerical aperture on the aforesaid first optical information recording medium side in aforesaid light converging optical system on the occasion that the light beam from the laser light source is read and converged as a spot on the first information recording surface, and NA2 is an effective numerical aperture on the aforesaid second optical information recording medium side in aforesaid light converging optical system on the occasion that the light beam from the laser light source is read and converged as a spot on the second information recording surface, and λ is a wavelength of the light beam emitted from aforesaid light source; and c) a detector that detects reflected light from the first or second information recording surface.

Further, in an objective lens in an optical pickup apparatus for converging on the first information recording surface of the first optical information recording medium having a t1-thick transparent substrate and on the second information recording surface of the second optical information recording medium having a transparent substrate with a thickness of t2 that is greater than t1, the best fit wavefront aberration through the t1-thick transparent substrate at NA1 is not more than 0.07·λ rms and that through the t2-thick transparent substrate at NA2 is not more than 0.07·λ rms, wherein NA1 is a numerical aperture on the aforesaid first optical information recording medium side in aforesaid light converging optical system on the occasion that the light beam from the laser light source is read and converged as a spot on the first information recording surface, and NA2 is an effective numerical aperture on the aforesaid second optical information recording medium side in aforesaid light converging optical system on the occasion that the light beam from the laser light source is read and converged as a spot on the second information recording surface, and λ is a wavelength of the light beam emitted from aforesaid light source.

Figure 9A:
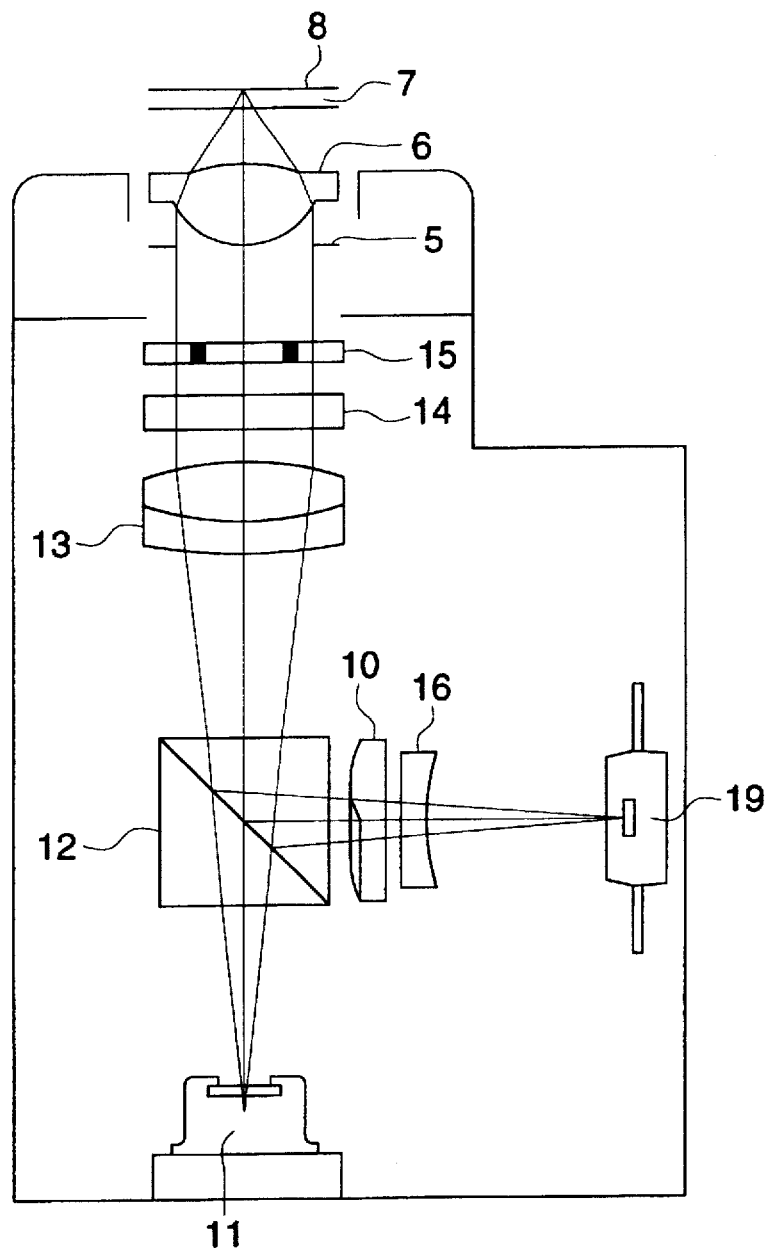
Figure 9:
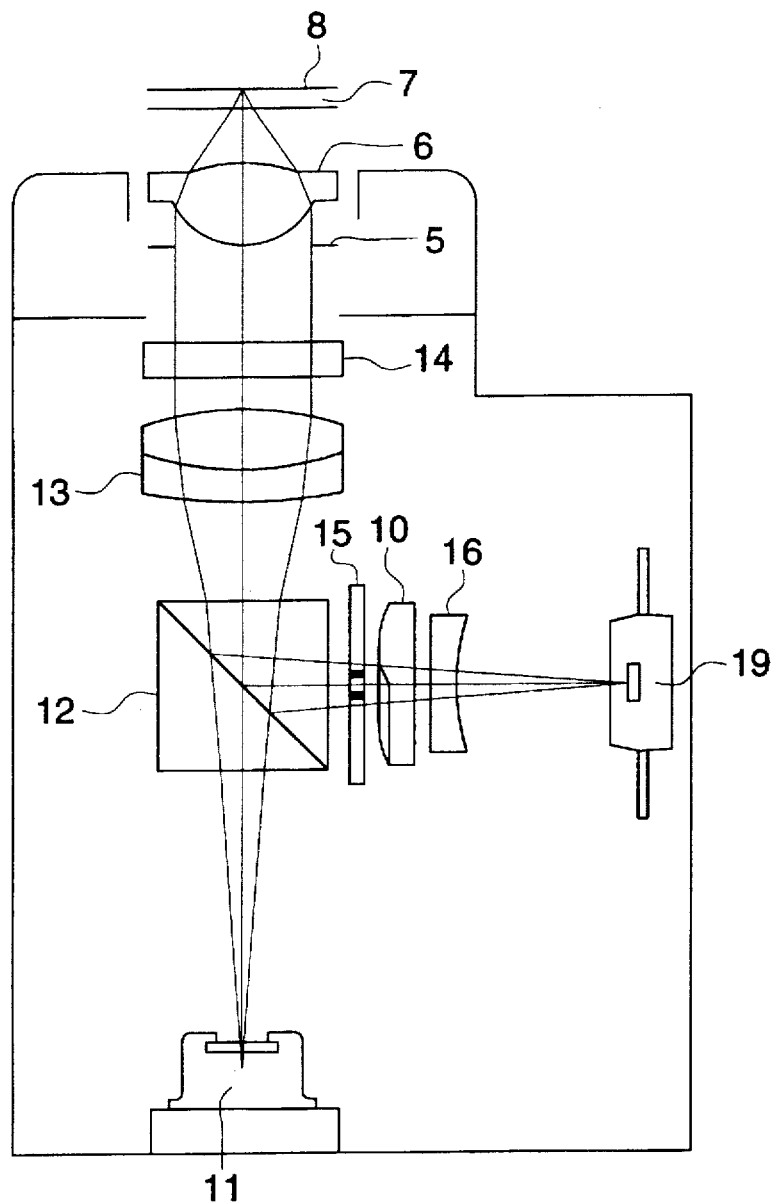

Each of FIGS. 9(a) and 9(b) is a diagram showing an optical pickup apparatus of Example 3.

Figure 10:
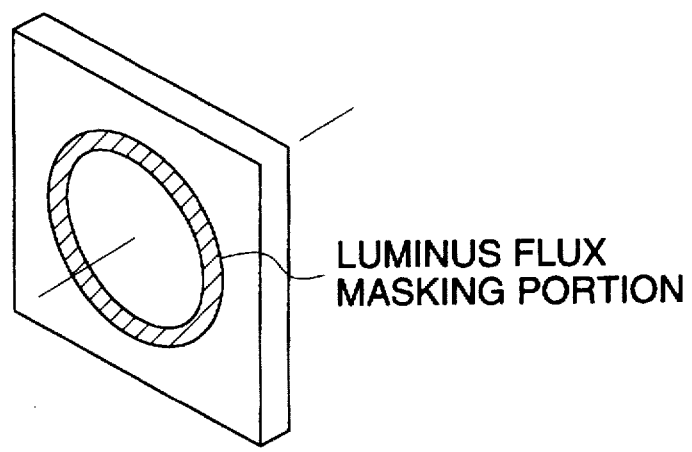
Figure 10:
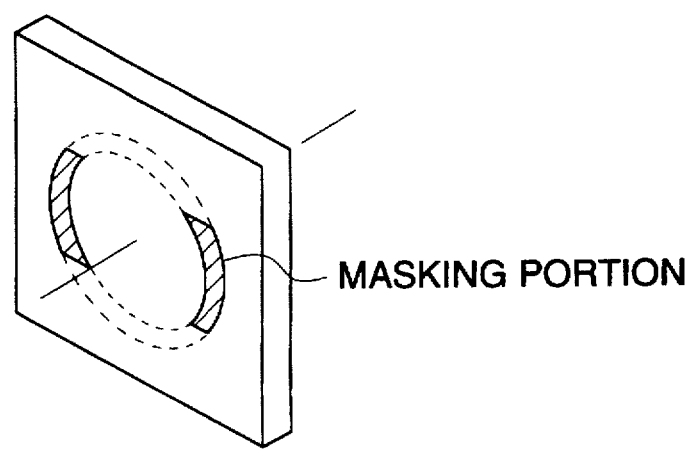

Each of FIGS. 10(a) and 10(b) is a diagram of a mask having a ring-shaped light beam masking portion in Example 3.

Figure 11:
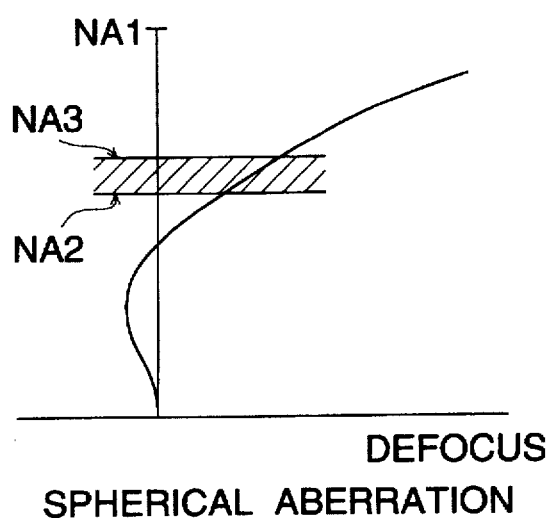

FIG. 11 is a diagram showing spherical aberration of an objective lens of an optical pickup in Example 3.

Each of FIGS. 12(a), 12(b) and 12(c) is a diagram showing element structure of a photo-detector of 8-division in Example 4.

Figure 13:
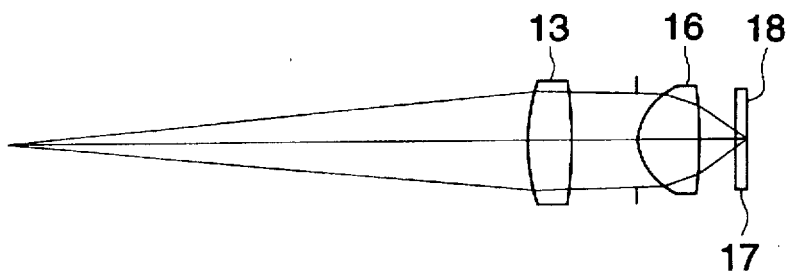
Figure 13:
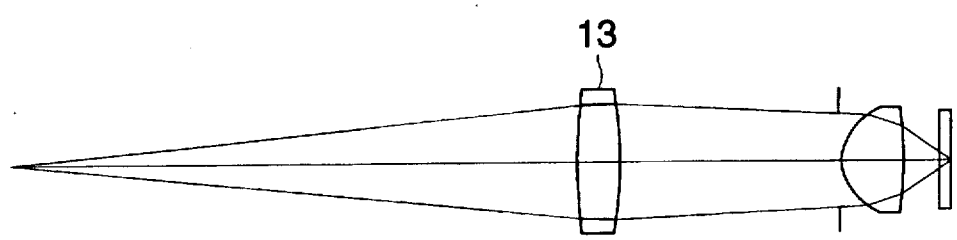

Each of FIGS. 13(a) and 13(b) shows a basic diagram of a light path for recording and/or reproducing optical system for an optical information recording medium of the invention.

Figure 14:
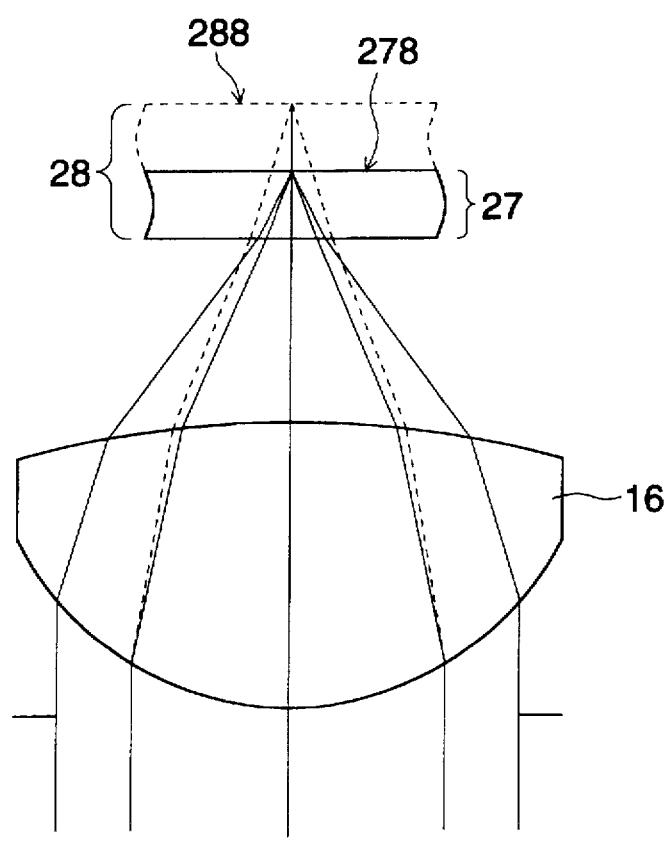

FIG. 14 is a diagram illustrating how light emerged from an objective lens is converged on a recording surface of a transparent substrate.

Figure 15:
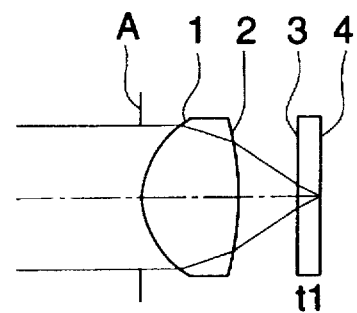
Figure 15:
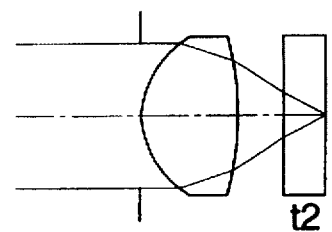

Each of FIGS. 15(a) and 15(b) is a section of an optical system in Example 5 of the invention.

Figure 16:
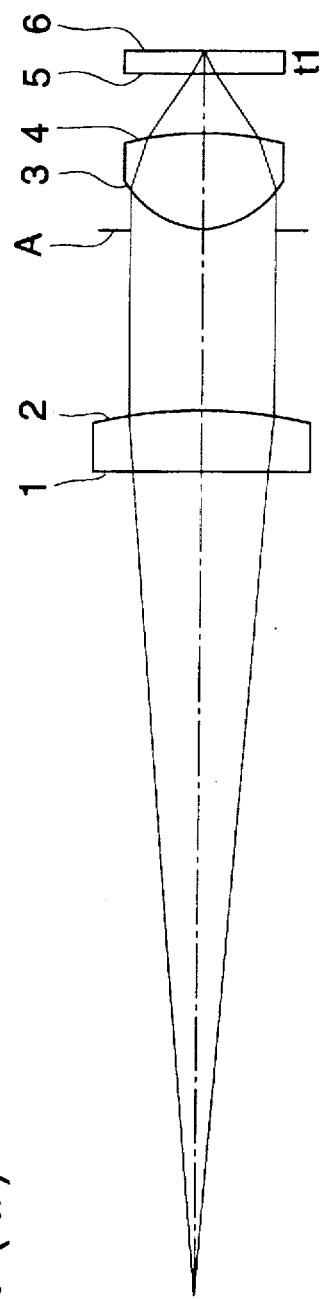
Figure 16:
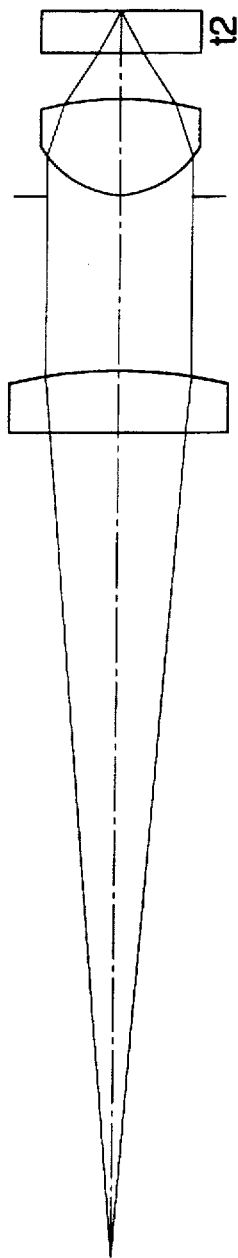

Each of FIGS. 16(a) and 16(b) is a section of an optical system in Example 6 of the invention.

Figure 17:
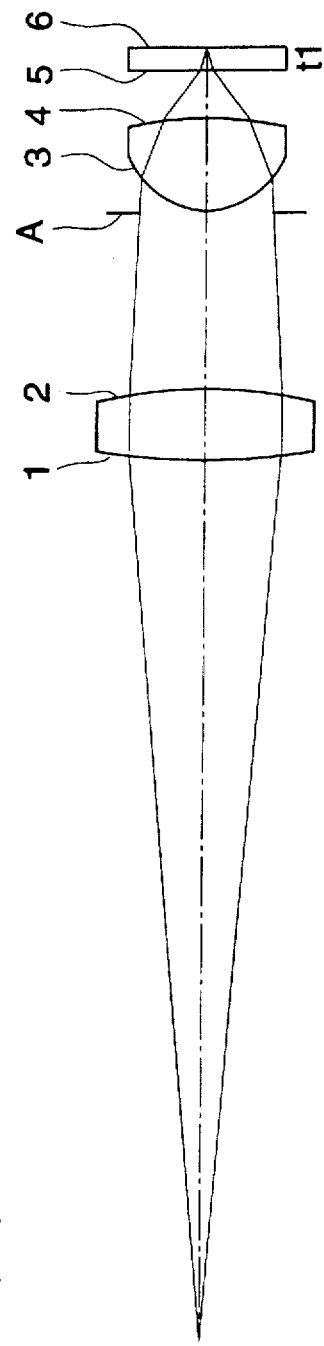
Figure 17:
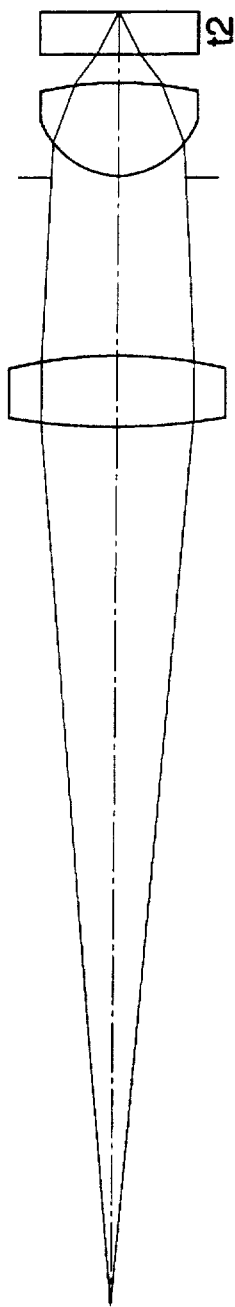

Each of FIGS. 17(a) and 17(b) is a section of an optical system in Example 7 of the invention.

Each of FIGS. 18(a) and 18(b) is a section of an optical system in Example 8 of the invention.

Figure 19A:
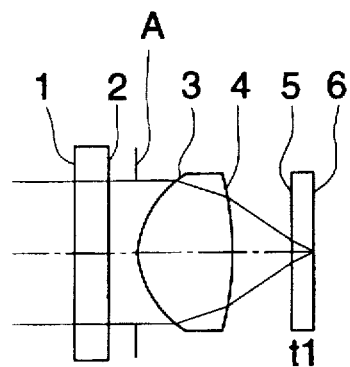
Figure 19B:
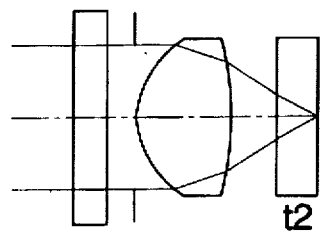

Each of FIGS. 19(a) and 19(b) is a section of an optical system in Example 9 of the invention.

FIGS. 20(a) and 20(b) respectively are spherical aberration diagrams wherein substrate thicknesses are respectively represented by t1 and t2 in the prior art.

Figure 21:
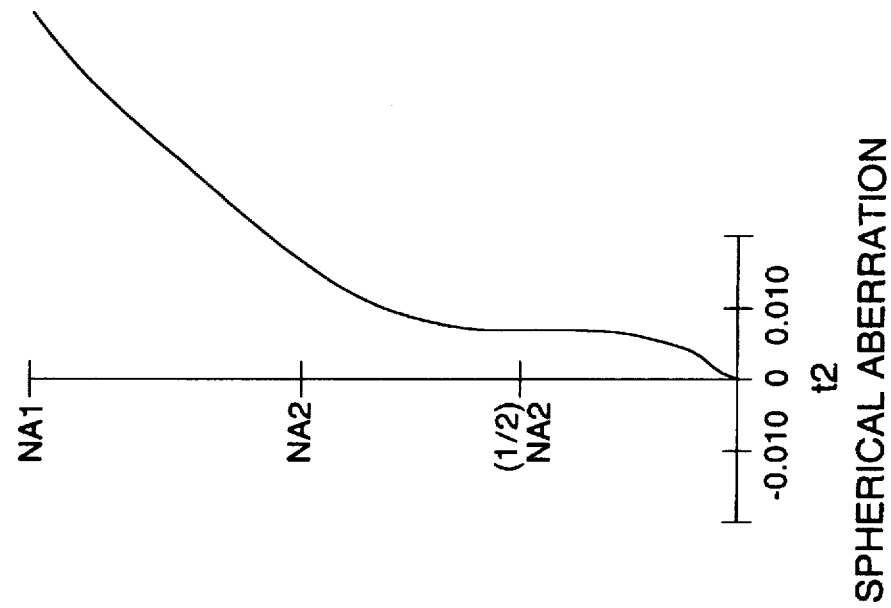
Figure 21:
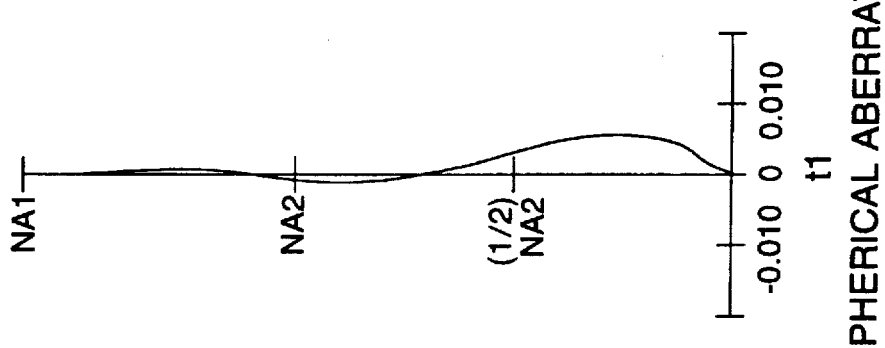

FIGS. 21(a) and 21(b) respectively are spherical aberration diagrams wherein substrate thicknesses are respectively represented by t1 and t2 in Example 5.

Figure 22:
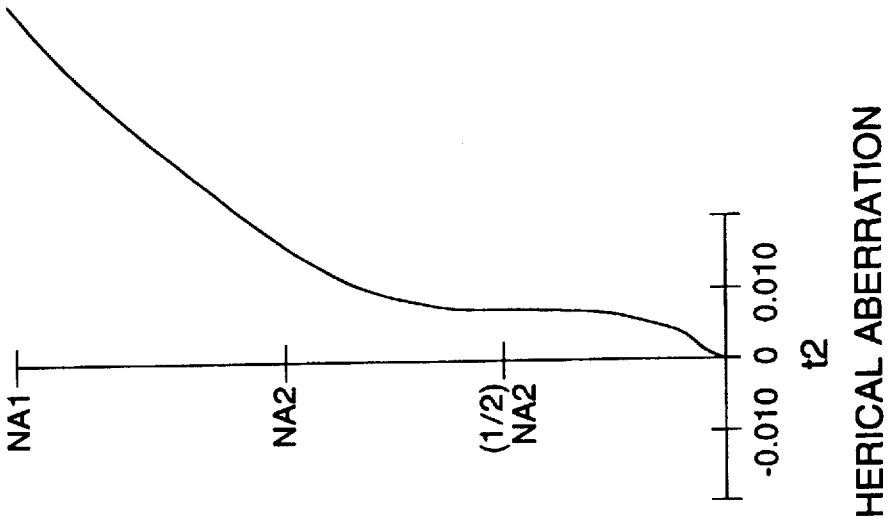
Figure 22:
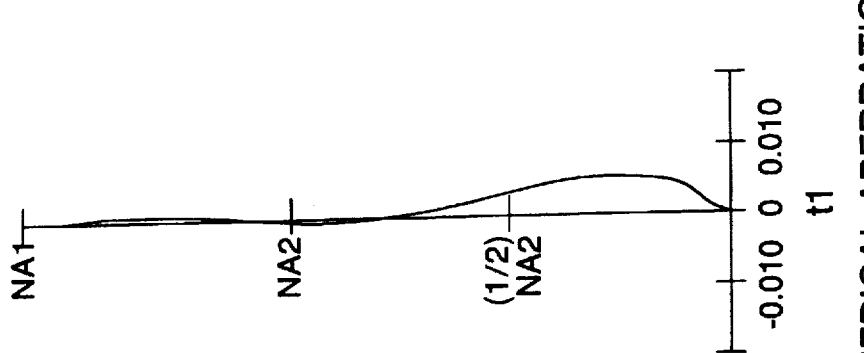

FIGS. 22(a) and 22(b) respectively are spherical aberration diagrams wherein substrate thicknesses are respectively represented by t1 and t2 in Example 6.

Figure 23:
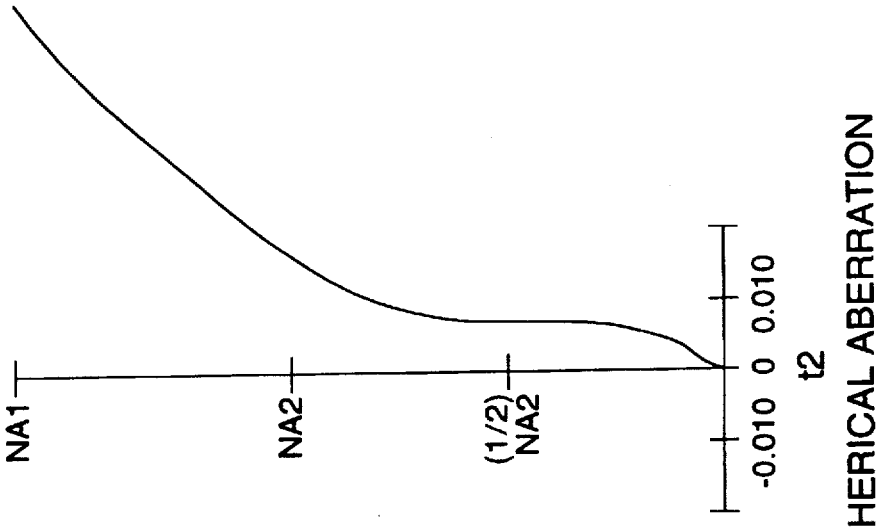
Figure 23:
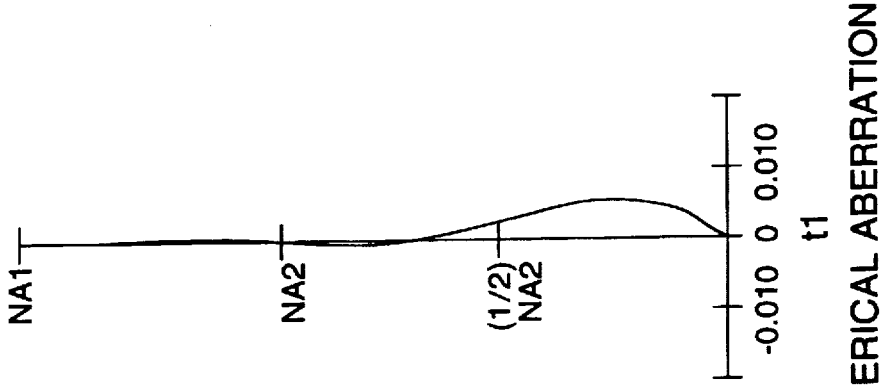

FIGS. 23(a) and 23(b) respectively are spherical aberration diagrams wherein substrate thicknesses are respectively represented by t1 and t2 in Example 7.

Figure 24:
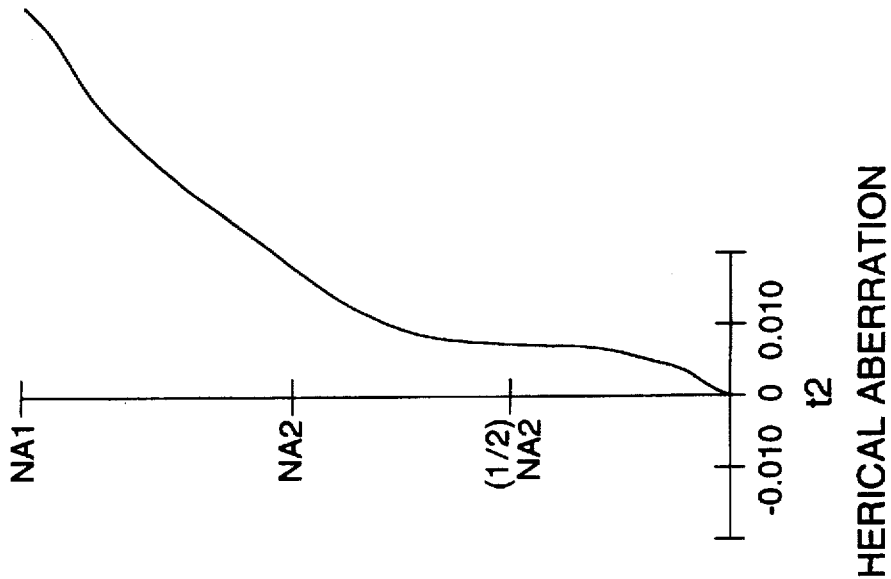
Figure 24:
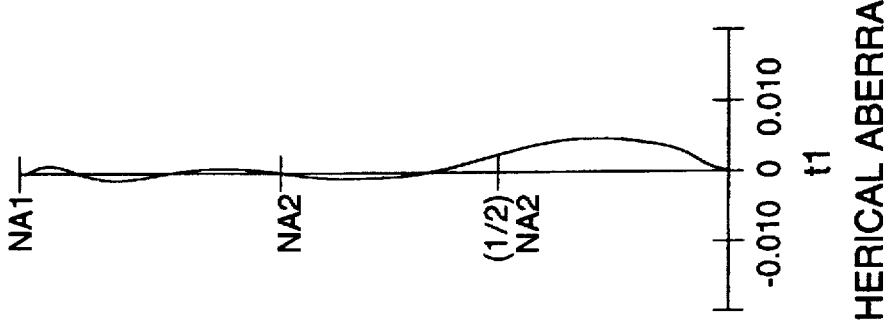

FIGS. 24(a) and 24(b) respectively are spherical aberration diagrams wherein substrate thicknesses are respectively represented by t1 and t2 in Example 8.

Figure 25:
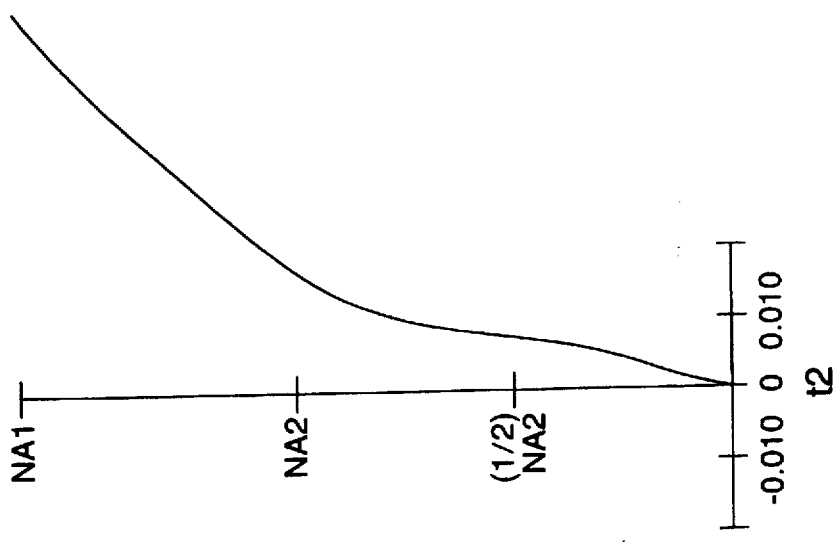
Figure 25:
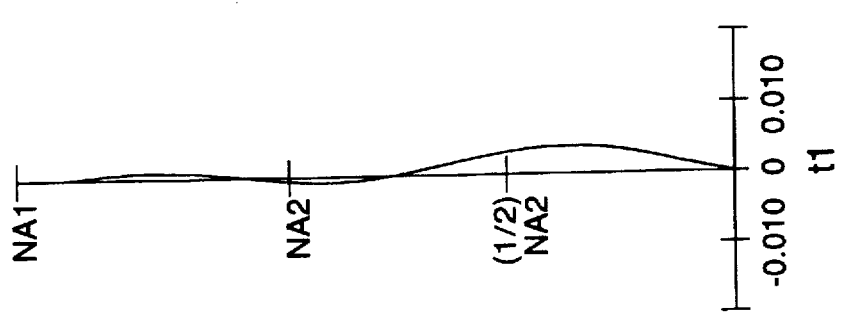

FIGS. 25(a) and 25(b) respectively are spherical aberration diagrams wherein substrate thicknesses are respectively represented by t1 and t2 in Example 9.

Figure 26:
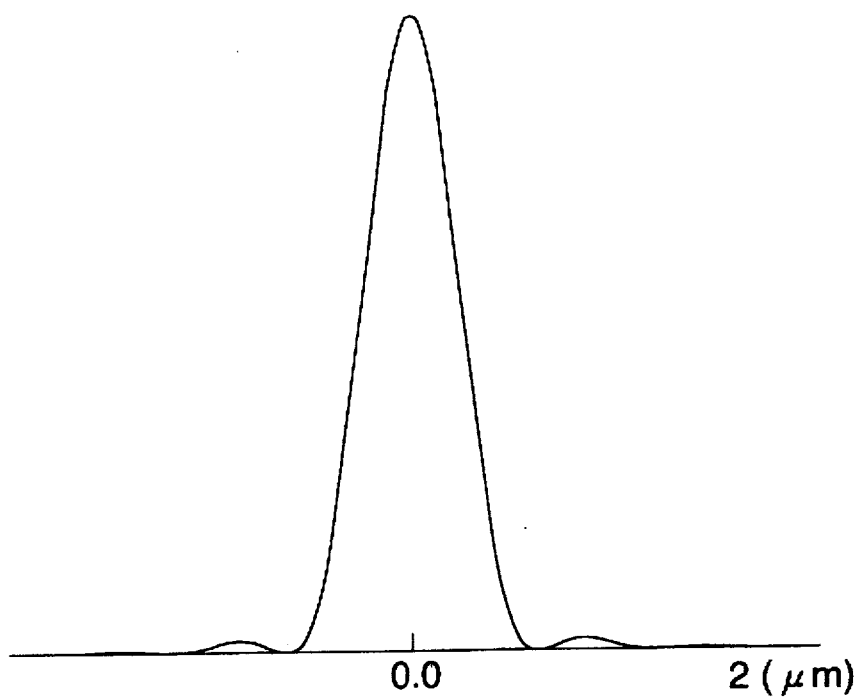

FIG. 26 shows a shape of a spot in the case of best defocus through thickness t1 in the prior art.

Figure 27:
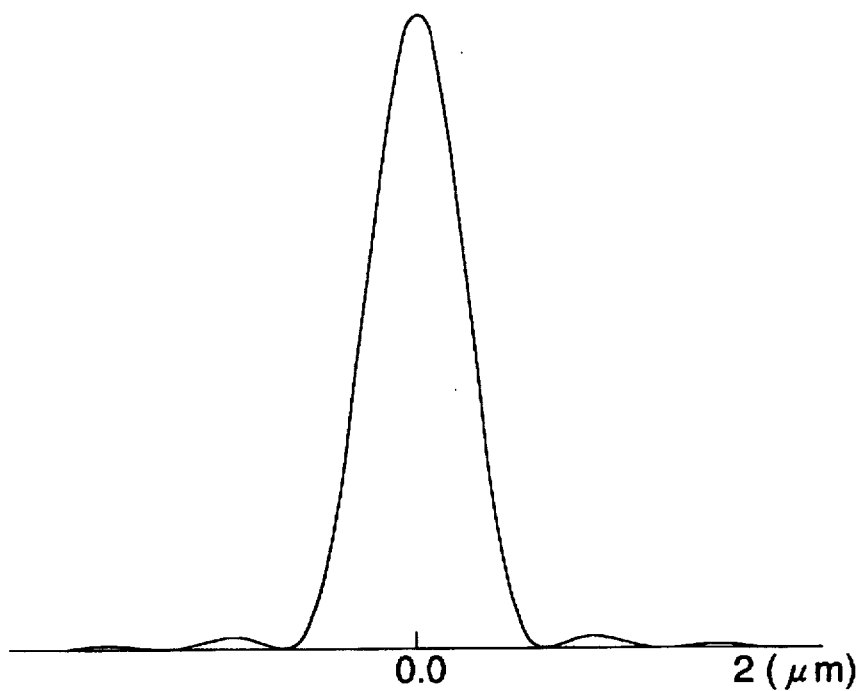

FIG. 27 shows a shape of a spot in the case of best defocus through thickness t1 in the invention.

Figure 28:
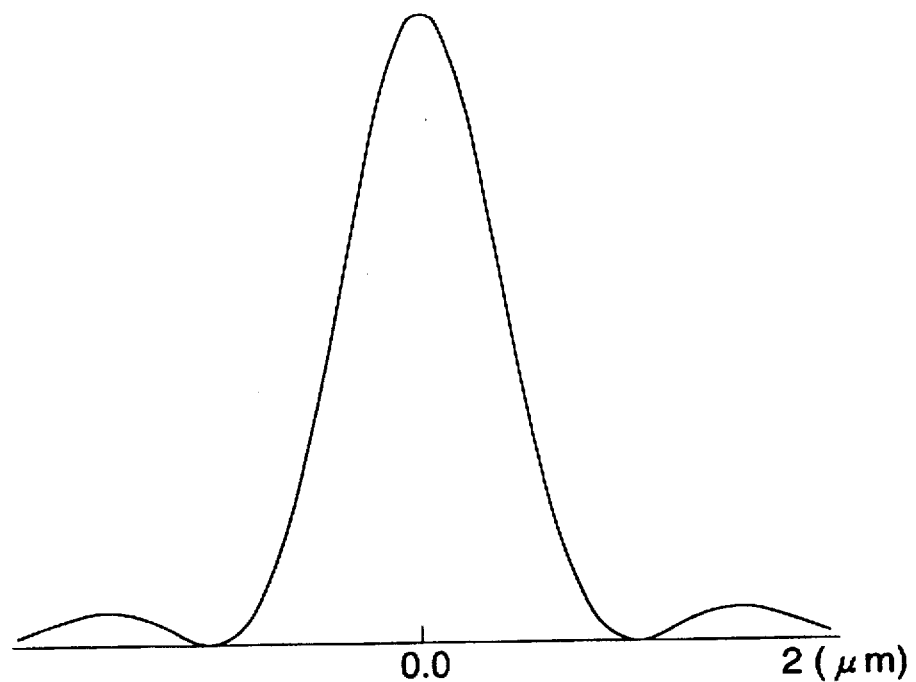

FIG. 28 shows a shape of a spot in the case of best defocus through thickness t2 in the prior art.

Figure 29:
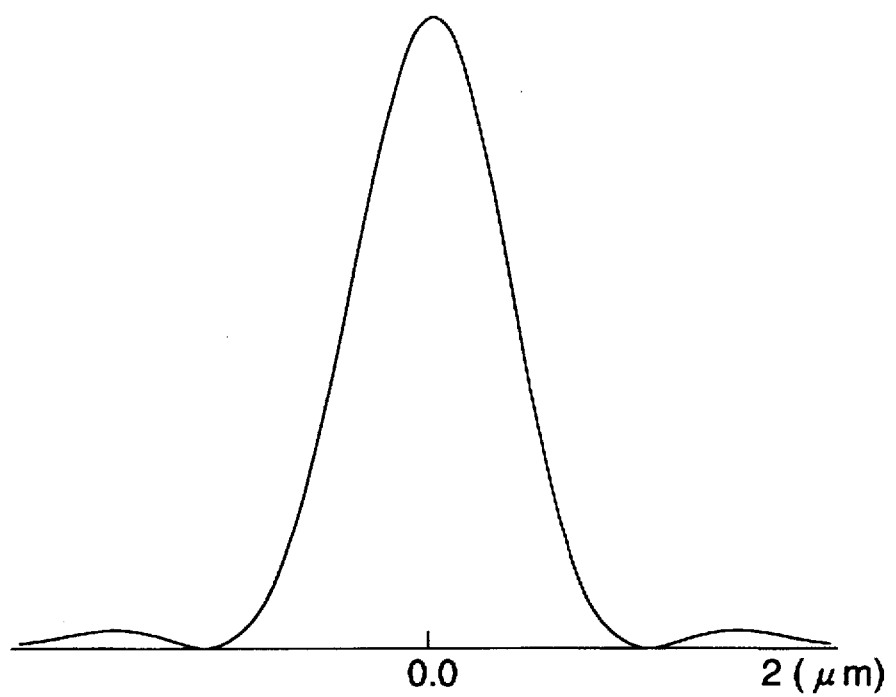

FIG. 29 shows a shape of a spot in the case of best defocus through thickness t2 in the invention.

DETAILED DESCRIPTION OF THE PREFERRED EMBODIMENT

In the invention, when an optical disk of 1.2 mm-thick substrate such as a conventional CD is reproduced by an optical pickup apparatus for DVD reproduction use, the wavelength of light source in the apparatus is in a range of 635 nm–690 nm which is shorter than 780 nm that is for the CD, resulting in a smaller effective NA (0.26–0.40) of the objective lens necessary for reading, and a converging optical system for DVD reproduction having a light beam in aforesaid range is used as it is for reading. range of the small NA.

Examples 1–9 of the invention will be explained as follows.

With regard to the numeral examples in a converging optical system in each example, a laser light source represents the 0-th surface, a radius of curvature of the i-th surface (including the aperture-stop surface) counted in succession from the 0-th surface is represented by ri, a thickness or a distance between the i-th surface and (i+1)th surface is represented by di, and a refractive index of a medium between the i-th surface and (i+1)th surface in terms of a wavelength of a light beam of the laser light source is represented ni. A refractive index of air is defined to be 1.

When an aspherical surface is used on the lens surface, the aspherical surface is represented by the following expression, under the conditions that X-axis is in the optical axis direction, H-axis is in the direction perpendicular to the optical axis, the advancing direction of light is positive, r represents a paraxial radius of curvature, K represents a circular cone coefficient, and A3, A4, A5, A6, A8, A10 and A12 represent an aspherical surface coefficient.

$$X = (H^2/r)/[1 + \sqrt{1 - (1+K)(H/r)^2}\,] +$$
$$A3 \cdot H^3 + A4 \cdot H^4 + A5 \cdot H^5 + A6 \cdot H^6 +$$
$$A8 \cdot H^8 + A10 \cdot H^{10} + A12 \cdot H^{12}$$

EXAMPLE 1

Figure 1:
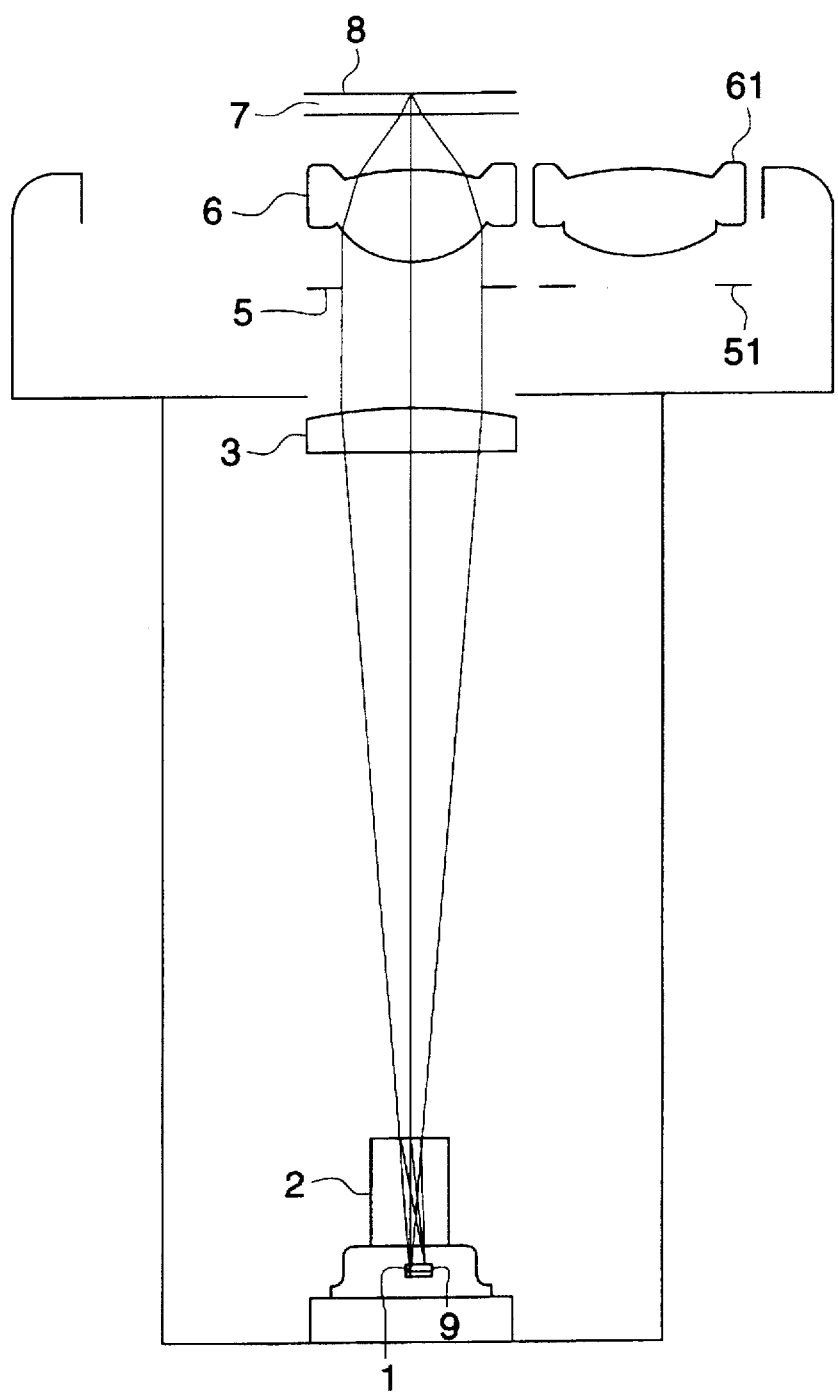
FIG. 1 is a diagram of an optical pickup apparatus which has been considered in the past.
Figure 2:
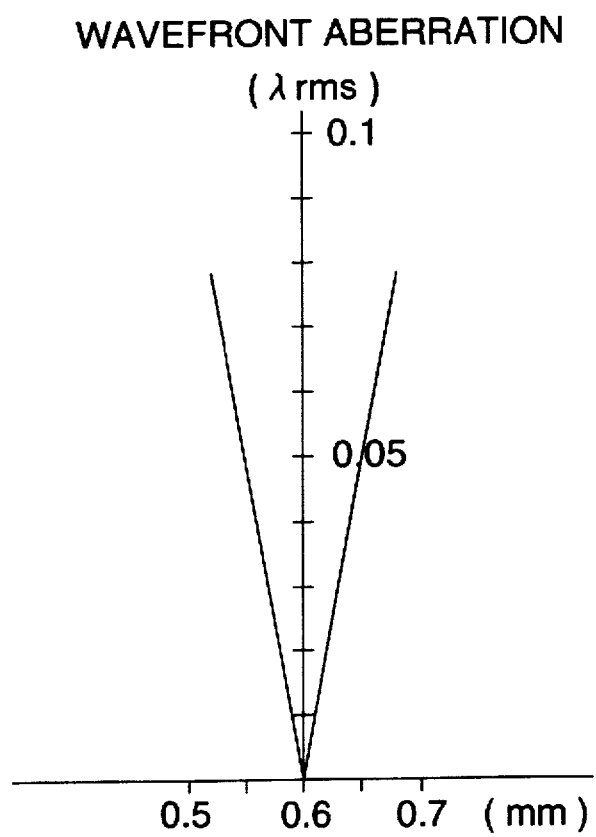
FIG. 2 is a diagram showing the relation between a substrate thickness and wavefront aberration.
Figure 3:
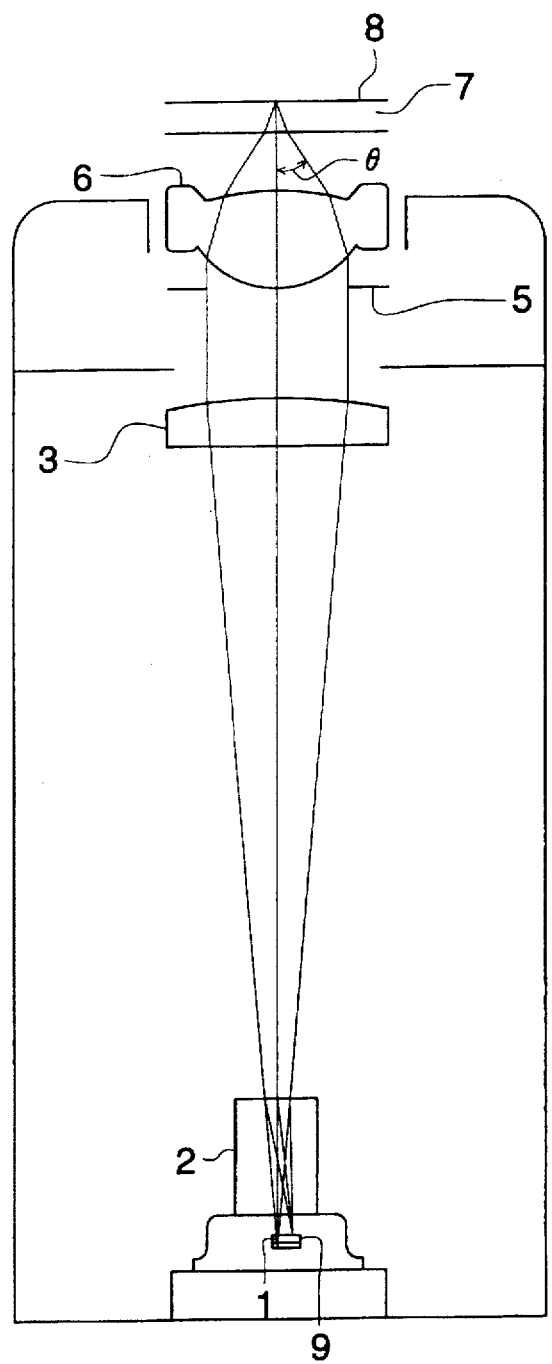
FIG. 3 is a diagram showing an optical pickup apparatus of Example 1.

In FIG. 3, a light beam emitted from laser light source 1 passes through hologram beam splitter 2, then through collimator lens 3, to turn into the light beam which is almost collimated, and then it is limited to a prescribed light beam by aperture-stop 5 and enters objective lens 6. The light beam entered the objective lens 6 is converged on information recording surface 8 through 0.6 mm-thick substrate 7. The light beam modulated by information pit and reflected on the information recording surface 8 returns to the hologram beam splitter 2 where the light beam is separated from on optical path of the laser light source 1 and enters optical detector 9.

The photo-detector 9 is a multi-split PIN photodiode which outputs from its element an electric current that is proportional to the intensity of an incident light beam and sends the electric current to an unillustrated detecting circuit. In the detecting circuit information signal, focus error signal, and track error signal are generated. The objective lens 6 is controlled with a 2-dimensional actuator composed of a magnetic circuit and a coil based on focus error signals and track error signals, and thereby makes a position of a light spot to be on an information track constantly.

Next, numerical examples of a light converging optical system in an example shown in FIG. 3 are shown below.

| i | ri | di | ni |
|---|---|---|---|
| 0 |  | 0.55 | 1 |
| 1 | ∞ | 3.0 | 1.514546 |
| 2 | ∞ | 23.9 | 1 |
| 3 | −156 | 1.2 | 1.878333 |
| 4 | −20.58 | 2.9 | 1 |
| 5 | ∞ | 0 | 1($\phi$3.99) |
| 6 | 2.0282 | 2.6 | 1.4981 |
| 7 | −5.223 | 1.526 | 1 |
| 8 | ∞ | 0.6 | 1.58 |
| 9 | Information recording surface | | |

Aspherical surface coefficient of r6

$K = -0.54772$ $A4 = 0.50718 \times 10^{-3}$ $A6 = 0.32560 \times 10^{-4}$ $A8 = -0.60919 \times 10^{-5}$ $A10 = -0.16366 \times 10^{-5}$ Aspherical surface coefficient of r7

$K = -21.8737$ $A4 = 0.98897 \times 10^{-2}$ $A6 = -0.29123 \times 10^{-2}$ $A8 = 0.57052 \times 10^{-3}$ $A10 = -0.50245 \times 10^{-4}$ In the present example, a wavelength of the light source is 635 nm, and a wavefront aberration on an axis is 0.001λ rms. In this case, NA1 is 0.6, and NA1 represents sin θ (see FIG. 3).

A wavefront aberration which is regarded as a standard for a diffraction limit is within 0.07λ rms, and when it is within the diffraction limit, it is possible to reproduce information. Incidentally, for reproduction of DVD wherein information recording density il is higher for a light spot size compared with a conventional optical disk such as a CD, the wave front aberration which is within 0.05λ rms is preferable.

Figure 4:
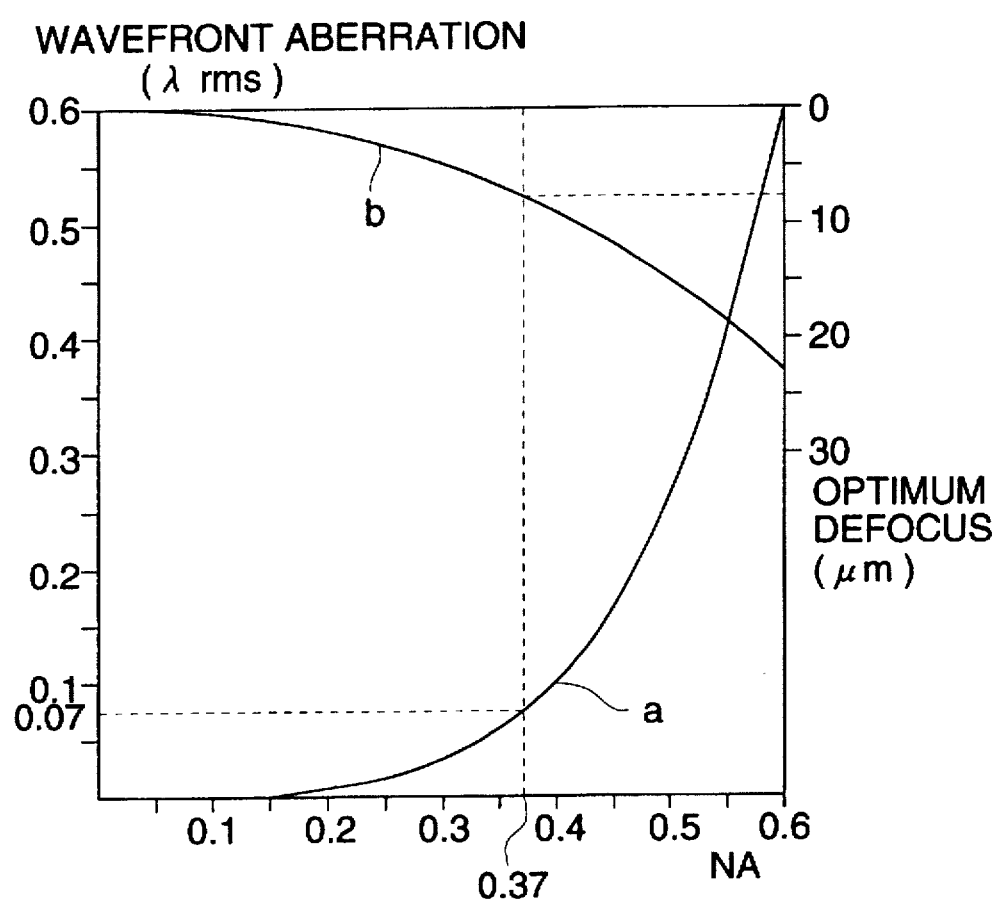
FIG. 4 is a diagram showing the relation between NA and wavefront aberration and that between NA and optimum defocus both under the condition of $t_2=1.2$ mm in Example 1.

FIG. 4 is a diagram showing the relation (curve a) between NA and best fit wave front aberration and the relation (curve b) between NA and optimum defocus amount both in the case where a light spot is converged through the second substrate having thickness $t_2$ of 1.2 mm in the converging optical system.

In FIG. 4, the best fit wave front aberration at the full aperture (NA1) of NA 0.6 is 0.60λ rms, and a position of the spot in that occasion is behind a paraxial focus by 23 μm in an equivalent air distance. A main component of the wavefront aberration is spherical aberration which is reduced sharply when NA is made small. When NA is 0.37, wavefront aberration is almost 0.07λ rms which is within a Marechal criterion. A spot position at this moment is behind a paraxial focus by about 8 μm in an equivalent air distance. When NA is 0.3, wavefront aberration is almost 0.03λ rms and a spot position is behind a paraxial focus by about 5 μm in an equivalent air distance.

In the case of a CD system with an optical disk having a 1.2 mm-thick substrate, sufficient reading capability can be obtained under the condition of λ/NA ≦ 1.75 μm (NA ≧ λ/1.75 μm).

Therefore, when focusing of a light spot on an information recording surface is controlled by using a laser of λ=635 nm and by driving the objective lens with a 2-dimensional actuator on a focusing control apparatus so that the spot position is behind a paraxial focus that gives best fit wavefront aberration at NA 0.37 by about 8 μm in an equivalent air distance, it is possible to read information on an optical disk of a CD system excellently.

It is also possible to reduce inter-symbol interference by using a wave form equalizer in a signal processing system and thereby to make the ratio of a spot size to information recording density to be almost the same as that of DVD and to make an NA to be smaller, for reading information on an optical disk of a CD system excellently. When a length of a shortest pit in DVD is 0.40 μm and that in CD is 0.86 μm, 1.14×0.86/0.40 is nearly equal to 2.46. Therefore, satisfactory efficiency for reading can be obtained with λ/NA≦2.46 (NA≧λ/2.46 μm).

Therefore, when focusing of a light spot is controlled by using a laser of λ=635 nm and by driving the objective lens with a 2-dimensional actuator on a focusing control apparatus so that the spot position is behind a paraxial focus that gives best fit wavefront aberration at NA 0.26 by about 4 μm in an equivalent air distance, it is possible to read information on an optical disk of a CD system excellently.

In this case, a light beam which passes through an area from NA2 to NA1 turns into undesired light without contributing to information reading. The light beam in this area has great spherical aberration and thereby is converged to be further behind an information recording surface, and a light beam reflected on the information recording surface passes through a substrate, an objective lens and a collimator lens to be given further spherical aberration, and arrives at a photo-detector where the light beam turns into flare light. Accordingly, it is preferable that a light-receiving area of the photo-detector has a necessary minimum area so that this flare light may be cut.

From the foregoing, let it be assumed that, as explained in the case of an optical disk of a CD system, a numerical aperture on the optical information recording medium side capable of reading information on the second optical information recording medium substantially and excellently is called an effective numerical aperture (=NA2), and NA2= λ/1.75 is for the occasion wherein an equalizer is not used in a signal processing system, while NA2=λ/2.46 is for the occasion wherein an equalizer is used in a signal processing system.

EXAMPLE 2

Figure 5:
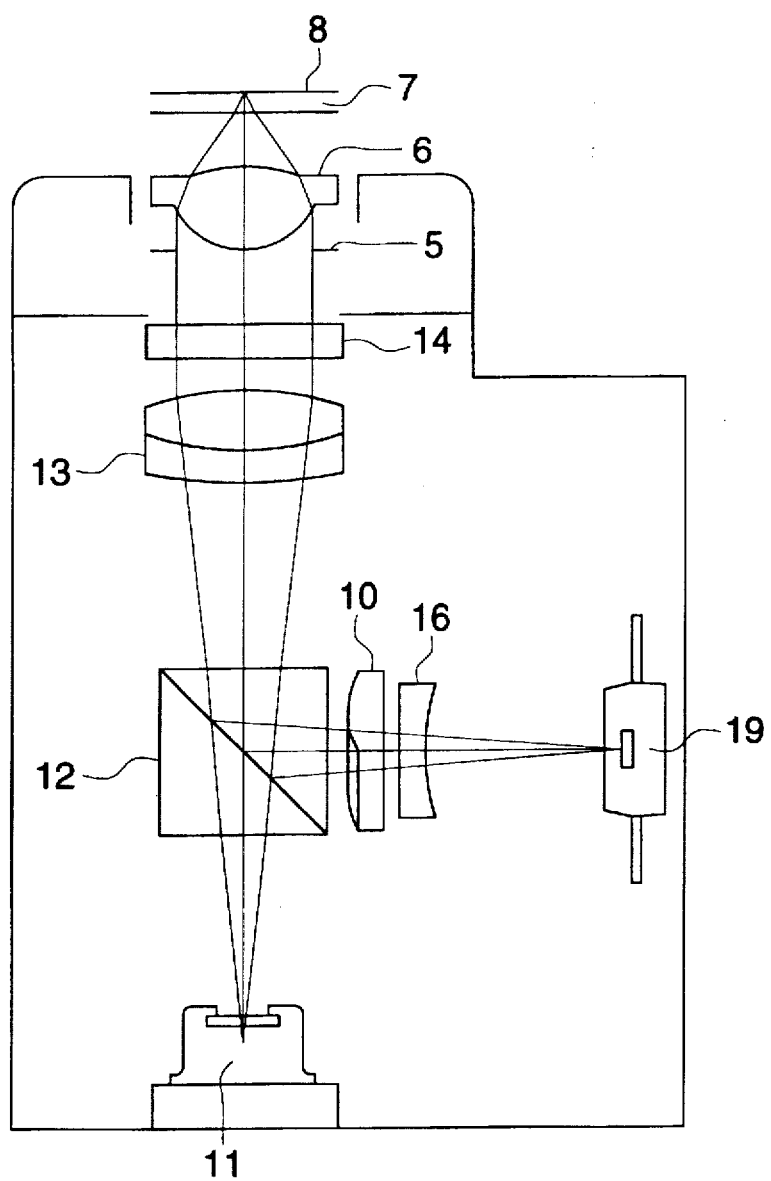
FIG. 5 is a diagram showing an optical pickup apparatus of Example 2.

FIG. 5 is a diagram showing an optical pickup apparatus in Example 2.

In FIG. 5, a light beam emitted from laser light source 11 (λ=680 nm) passes through polarized beam splitter 12, collimator lens 13 and quarter wave plate 14 to turn into a collimated light beam of circularly polarized light. This light beam is converged on information recording surface 8 through substrate 7 of an optical disk by objective lens 6 driven by an unillustrated two-dimensional actuator in both the focusing direction and the tracking direction. The light beam modulated by information pit and reflected on the information recording surface 8 passes again through the objective lens 6, quarter wave plate 14 and collimator lens 13 and then enters the polarized beam splitter 12 where the light beam is reflected to advance to photo-detector 19. Cylindrical lens arranged on an optical path toward the photo-detector gives astigmatism, and convex lens 16 enlarges magnification.

Figure 6:
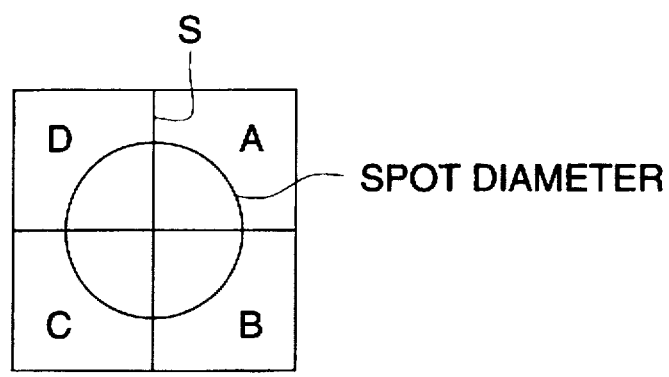
FIG. 6 is a diagram showing element structure of a photo-detector in Example 2.

FIG. 6 is a diagram showing how elements of a photo-detector are structured.

In FIG. 6, photo-detector 19 is composed of elements divided into 4 portions of A–D as shown in the figure, and division line S is arranged so that it may almost agree in terms of direction with mapping of an information track on the information recording surface of an optical disk and it may be inclined by 45° from a generatrix of cylindrical lens 10. With regard to detection of focus error signals, they can be obtained through operation of (A+C)–(B+D) in an astigmatism method, and with regard to detection of track error signals, they can be obtained through operation of (A+B)–(C+D) in a push-pull method, and through operation of (A+C)–(B+D) in a phase difference detection method, and information signals can be obtained by (A+B+C+D). These detecting methods are all known publicly, and detailed explanation therefor is omitted here accordingly.

Next, the numeral examples in the converging optical system that is used in the optical pickup apparatus shown in FIG. 5 will be explained.

Incidentally, collimator lens 13 can be designed to be optimum so that a collimated light beam which hardly has aberration can enter an objective lens. In the following numerical examples, therefore, there is shown the constitution after a light beam enters an objective lens on the premise that a collimator lens capable of emerging a collimated light beam being almost free from aberration is used. Incidentally, in this example, the first surface is represented by aperture-stop 5 arranged on the light source side of an objective lens, and from this point in succession, a radius of curvature of i-th lens is represented by ri, a thickness or distance between the i-th surface and the (i+1)th surface is represented by di, and a refractive index of a medium material located between the i-th surface and the (i+1)th surface is represented by ni.

| i | ri | di | ni |
|---|---|---|---|
| 1 | ∞ (Aperture) | 0 | 1(φ3.997) |
| 2 | 2.2507 | 2.4 | 1.585352 |
| 3 | −6.4085 | 1.542 | 1 |
| 4 | ∞ | 0.6 | 1.58 |
| 5 | ∞(Information recording surface) | | |

Aspherical coefficient of r2

$K=-0.50079$ $A4=0.73179\times10^{-2}$ $A6=-0.29458\times10^{-2}$ $A8=0.67881\times10^{-3}$ $A10=-0.10522\times10^{-3}$ $A12=0.62390\times10^{-5}$ Aspherical surface coefficient of r7

$K=-182.00$ $A4=0.24278\times10^{-2}$ $A6=-0.68251\times10^{-2}$ $A8=0.41007\times10^{-2}$ $A10=-0.11386\times10^{-2}$ $A12=0.12549\times10^{-3}$ $f=3.17$ m $NA=0.63$ In the light source wavelength λ=680 nm in the present example, NA (NA1) necessary for reading the first optical disk (e.g.,DVD) is 0.60, and NA (NA2) necessary for reading the second optical disk (e.g.,CD) is 0.39.

Figure 7:
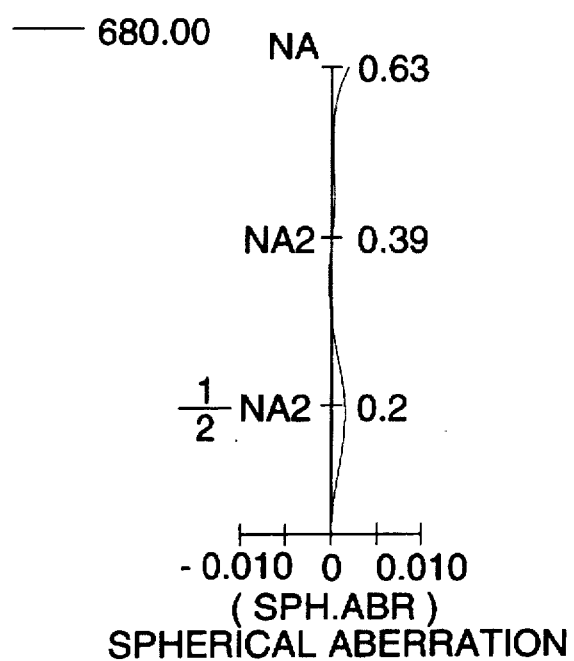
FIGS. 7(a) is a diagram showing spherical aberration of an objective lens in Example 2 and 7(b) shows interference fringes of a light spot.
Figure 7:
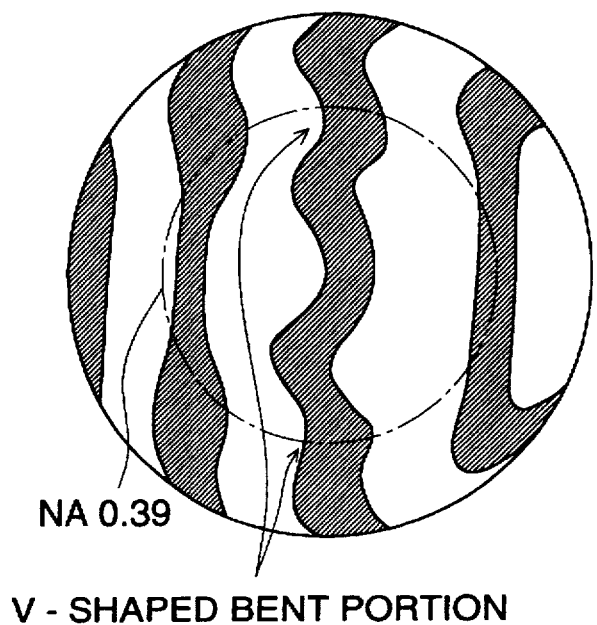

FIG. 7(a) is a diagram showing spherical aberration in the case wherein substrate thickness t1 of an objective lens in the present example is 0.6 mm (which corresponds to the substrate thickness-of the first optical disk).

In FIG. 7(a), when the substrate thickness t1 of the objective lens is 0.6 mm, the spherical aberration of the objective lens is over-corrected (over) at the height near (½)NA2 (NA 0.2), and is corrected completely at the height near NA2 (NA 0.4). In a spherical aberration curve, under correction (under) is observed in the area between the height of (½)NA2 and the height of NA2. The best fit wavefront aberration at NA 0.63 in this case is about 0.02λ rms.

Concerning this objective lens, when a light spot converged through transparent substrate with thickness t1 of 0.6 mm is observed while straightening interference fringes to be almost straight by an interferometer, the results of the observation appear to be those shown in FIG. 7(b).

In an objective lens whose spherical aberration has been corrected completely, straight interference fringes which are in parallel each other are observed. In the objective lens in this example, however, the spherical aberration is over-corrected at the height near (½)NA2 (NA 0.2), and it is corrected completely at the height near NA2 (NA 0.4). Therefore, the interference fringe has a V-shaped bent portion in the vicinity of numerical aperture NA4 (NA4≈NA2= 0.39 in this example) which is greater than that near (½)NA2 (NA 0.2) and smaller than NA1. Namely, the objective lens in this example has wavefront aberration in which interference fringes are observed.

Incidentally, with regard to NA4, it is preferable to arrange so that the following is satisfied.

(½)NA2<NA4<(½)(NA1+NA2)

Figure 8:
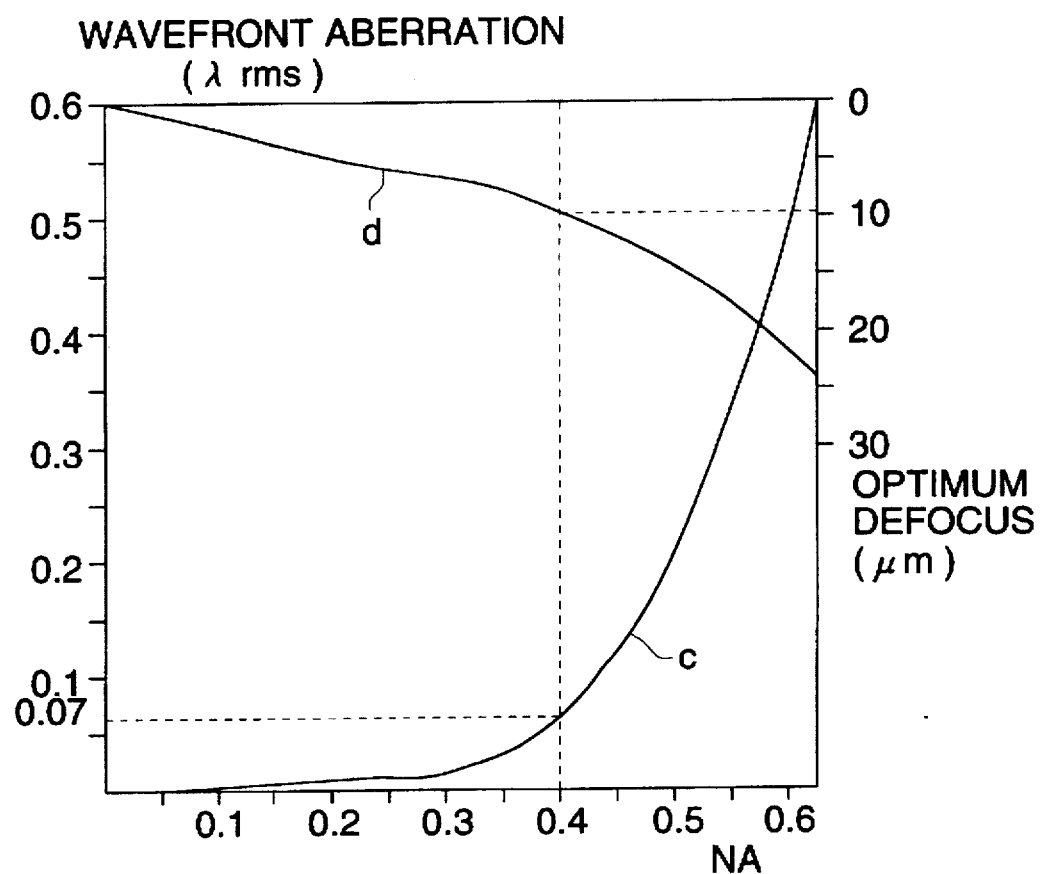
FIG. 8 is a diagram showing the relation between NA and wavefront aberration and that between NA and optimum defocus both under the condition of a substrate of $t_2=1.2$ mm in an objective lens in Example 2.

FIG. 8 is a diagram showing the relation (curve c) between NA and best fit wavefront aberration and the relation (curve d) between NA and defocus amount in the case of substrate thickness t2=1.2 mm in the objective lens.

In FIG. 8, when a light beam at the height of (½)NA2 of an objective lens is over-corrected more than that at the height of NA2, the light beam at the height of NA2 is more under than that at the height of (½)NA2, and thereby it is possible to reduce the over spherical aberration caused by thicker substrates. At the point of NA 0.41, wavefront aberration takes about 0.07λ rms, which is within a Marechal criterion. The best fit wavefront aberration at NA2 (NA 0.39) is 0.05λ rms, and such objective lens makes it possible to read an optical disk of a CD system sufficiently. Further, an optical disk having thickness t1 of 0.6 mm of a DVD system can also be read properly with wavefront aberration of 0.02λ rms at NA 0.63 which is sufficiently small. In this example, spherical aberration is subjected to over-correction for a light beam at the height of (½)NA2 rather than for that at the height of NA2 by means of an objective lens, when the substrate thickness t2 is 0.6 mm. However, this can also be done by means of a collimator lens, and in short, all has to be done is that over-correction is applied to a light beam at the height of (½)NA2 rather than to that at the height of NA2 as a whole when a light beam emitted from a laser light source is converged on an information recording surface of an optical disk through a substrate having thickness t1 of 0.6 mm.

When the arrangement mentioned above is taken, a loss caused by an optical system can be reduced and emission efficiency can be enhanced, which is suitable for an optical pickup apparatus which records on an optical disk capable of being written thereon.

EXAMPLE 3

Each of FIGS. 9(a) and 9(b) is a diagram showing an optical pickup apparatus of Example 3. Each of FIGS. 10(a) and 10(b) is a diagram of a mask having a ring-shaped light beam masking portion.

FIG. 9(a) represents FIG. 5 of Example 2 wherein a mask having a ring-shaped light beam masking portion shown in FIG. 10(a) is provided on an optical path between quarter wave plate 14 and objective lens 6, which is intended to improve reading efficiency further by cutting an area of the light beam that is detrimental when reading information on the second optical disk.

In FIG. 9(a), a light beam emitted from laser light source 11 (λ=680 nm) is transmitted through polarized beam splitter 12, collimator lens 13 and quarter wave plate 14 to turn into a circularly polarized collimated beam. This beam is transmitted through ring-shaped mask 15 so that its light beam corresponding to the mask portion is cut, and is converged by objective lens 6 on information recording surface 8 through substrate 7 of an optical disk. The light beam modulated by information pit and reflected on the information recording surface 8 is transmitted again through objective lens 6, ring-shaped mask 15, quarter wave plate 14 and collimator lens 13 to enter polarized beam splitter 12 where the light beam is reflected and advances to photo-detector 19. Cylindrical lens arranged on an optical path toward the photo-detector gives astigmatism, and convex lens 16 enlarges magnification. Structure of the photo-detector and detection of focus error signals, track error signals and information signals are the same as those in Example 2.

FIG. 11 is a diagram of spherical aberration including defocus at the position where the wavefront aberration becomes the best within a range of NA2 necessary for reading information in the second optical disk (e.g., CD) when a substrate having thickness t2 of 1.2 mm is passed through by a flux in a converging optical system of the present example.

In FIG. 11, an area from the point on an optical axis to NA2 is a light beam effective for reading information, an area outside aforesaid area from NA2 to NA1 is a light beam representing noise component without contributing to reading. In this light beam, a portion in the vicinity of NA1 has extremely great spherical aberration, and thereby it is in the defocused state, which results not to be a big noise factor. A portion in the vicinity of NA2 becomes a flare adjoining a light beam effective for reading, and this light beam is modulated by information pit on an information recording surface, and when it enters a photo-detector, it becomes a big noise, causing jitter of reproducing information signal. Therefore, when a ring-shaped mask masking a light beam is provided in a numerical aperture which is greater than an area of NA2 and smaller than NA1, it is possible to prevent a light beam causing a noise increase from entering a photo-detector.

An outside diameter of this mask portion which is too large causes an increase of a light amount loss and deterioration of performance for reading information from the first optical disk (e.g., DVD). Therefore, it is preferable that a light beam becoming a noise component is subjected to the necessary minimum masking, and a concrete method is to cut up to a light beam which is focused on the point behind the focal point for best fit wavefront aberration within a range of NA2 by 1-2 times the depth of focus. The depth of focus is represented by $2\lambda/NA^2$, and it is about 2.2 μm in the case of $\lambda$=680 nm and NA=0.39, and it corresponds to a light beam of NA 0.42 in the present converging optical system. Further, for NA 0.47, the focal point is behind by about 4.7 μm which is about twice the depth of focus. It is therefore preferable that an inside of the light beam masking ring takes NA 0.39 and an outside thereof takes NA 0.42–0.47.

This mask does not necessarily be one for masking based on absorption of a light beam but may also be one based on effect of reflection, scattering, refraction or diffraction, and it has only to be one wherein a light beam going back to a photo-detector can be cut. Further, this mask may also be united with other optical elements such as a collimator lens, an objective lens and a beam splitter.

It is especially preferable that the mask is provided to be one body on the optical surface on the incidence side or on the emergence side of an objective lens because a masked portion in a light beam entering an information recording surface is not shifted even when the objective lens is shifted by tracking.

In addition, the mask may be provided at any position in an optical path along which a light beam starting from a laser light source passes through an objective lens, then reflected on an information recording surface, and advances to a photodetector. In particular, when the mask is provided in the optical path between a beam splitter and a photo-detector as shown in FIG. 9(b), a light beam from the laser light source can be guided more effectively to the information recording surface, which is preferable. In such an arrangement, it is possible to lessen a loss of an amount of light in reading or writing for the first optical disk, and thereby to reduce a light beam causing an increase of noise entering a photodetector in the course of reading the second optical disk.

Incidentally, though a ring-shaped mask is described in the example mentioned above, it is also possible to employ another mask having a light beam masking portion wherein light can be transmitted as shown in FIG. 10(b) through portions other than light-receiving portions A and C (or B and D) arranged in the diagonal position that is in parallel with a generatrix of a cylindrical lens of a photo-detector shown in FIG. 6 in the ring-shaped light beam masking portion shown in FIG. 10(a). In such an arrangement, it is possible to lessen a loss of an amount of light in reading or writing for the first optical disk, and thereby to reduce a light beam causing an increase of noise entering a photo-detector in the course of reading the second optical disk.

EXAMPLE 4

Figure 12:
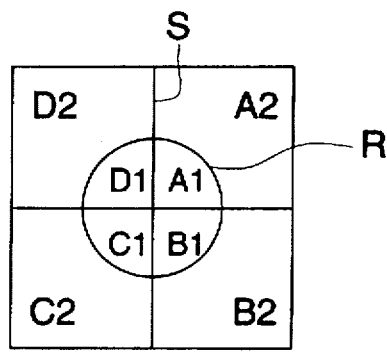
Figure 12:
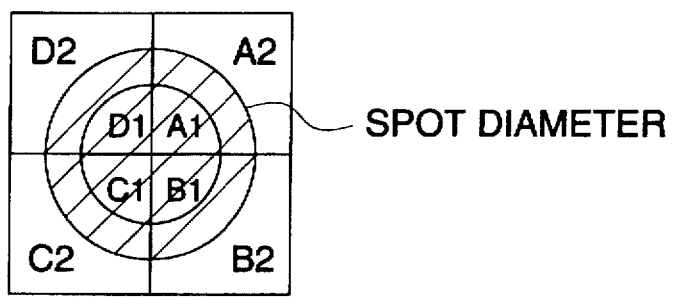
Figure 12:
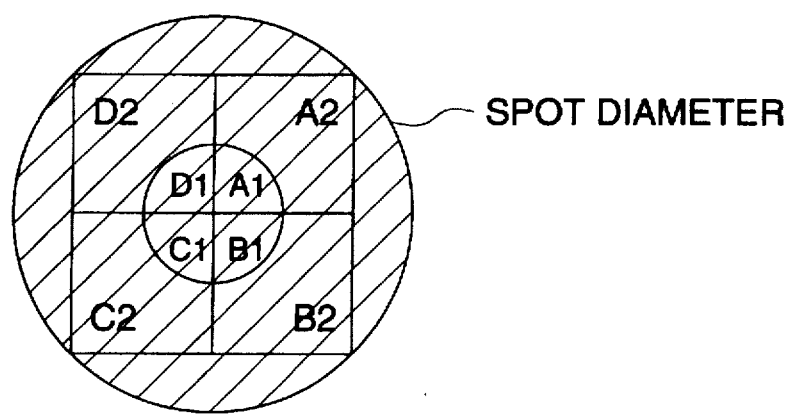

Each of FIGS. 12(a), 12(b) and 12(c) shows element structure of a photo-detector of an 8-division type, and FIG. 12(a) shows element structure, FIG. 12(b) is a diagram showing how a light beam from first optical disk (e. g., DVD) having a 0.6 mm-thick transparent substrate is converged, and FIG. 12 (C) is a diagram showing how a light beam from the second optical disk (e. g., CD) having a 1.2 mm-thick transparent substrate is converged.

In FIG. 5 of Example 2, it is possible to improve reproduction efficiency further by changing a 4-division photo-detector to an 8-division photo-detector shown in FIG. 12(a) and by switching the elements which detect information signals, depending on the type of an optical disk.

FIG. 12(b) shows how a light beam from the first optical disk having a 0.6 mm-thick transparent substrate is converged on an 8-division photo-detector.

Dividing line S is arranged to be almost in parallel with mapping of information track on an information recording surface in the optical disk, and an inner 4-division area is separated from an outer 4-division area by dividing line R.

Focus error signals are detected through astigmatism method by $(A1+A2+C1+C2)-(B1+B2+D1+D2)$ and track error signals are detected through a push-pull method by $(A1+A2+B1+B2)-(C1+C2+D1+D2)$ Information signals are detected by the sum total of all elements of (A1+A2+B1+B2+C1+C2+D1+D2) or by outer portions of (A2+B2+C2+D2). In the case of signal detection based on the outer portions only, high frequency components are emphasized, which makes it possible to improve a degree of modulation of a shortest pit.

FIG. 12(c) shows how a light beam from the second optical disk having a 1.2 mm-thick transparent substrate is converged on an 8-division photo-detector.

In the figure, a central portion has high intensity of light, and an area surrounding the central portion shows flare-like conversion of light, and information signals are detected by (A1+B1+C1+D1) with which the central portion is mainly subjected to light-receiving. It is preferable that this light-receiving range is aforesaid NA2.

Focus error signals are detected through an astigmatism method by (A1+A2+C1+C2)–(B1+B2+D1+D2), or by (A1+C1)–(B1+D1), and track error signals are detected through a push-pull method by (A1+A2+B1+B2)–(C1+C2+D1+D2) or by (A1+B1)–(C1+D1), When the photo-detector is divided into areas each detecting information signals, it is possible to detect signals in an area where there is no flare light caused by spherical aberration generated by a 1.2 mm-thick substrate such as a CD, thus, reproduction efficiency can be improved. Further, when a ring-shaped light beam masking portion with not less than NA2 and not more than NA1, preferably with 1.05·NA2–1.20 NA2 and more preferably with 1.1·NA2–1.2·NA2 is provided in an optical path, it is further possible to cut a light beam which turns into a noise component, and thereby to reduce jitters. Effect of the invention The invention makes it possible for a simply-structured and compact pickup apparatus for DVD reproduction use to read an optical disk of a CD system wherein a substrate thickness and information recording density are greatly different from those in the pickup apparatus for DVD reproduction use. For the system for recording, the invention can provide an optical pickup apparatus which is efficient in terms of emission and is capable of writing under lower laser power, an objective lens for optical pickup use, a converging optical system for optical pickup use and an optical disk apparatus.

Examples 5–9 of an optical system for recording use and/or reproduction use for optical information recording media of the invention will be explained as follows, referring to FIGS. 13(a)–29.

Each of FIGS. 13(a) and 13(b) is a diagram of an optical path showing basic structure of an example of an optical system for recording use and/or reproduction use for optical information recording media of the invention.

In FIG. 13(a), the numeral 13 represents the first lens group composed of a single lens, 16 represents an objective lens, 17 represents a transparent substrate of an optical information recording medium, and 18 represents a recording surface of the optical information recording medium. A divergent light beam emitted from a light source (not shown) is converted into a convergent light by the first lens group 13 located in the vicinity of objective lens 16, then enters the objective lens 16 and is converged on recording surface 18 through transparent substrate 17.

FIG. 13(b) shows an example wherein the first lens group 13 in FIG. 13(a) is arranged to be away from the objective lens 16 so that an optical element such as a mirror or the like may be positioned between the first lens group 13 and objective lens 16.

FIG. 14 is a diagram illustrating how a light beam emitted from objective lens 16 is converged on a recording surface through a transparent substrate, wherein the numeral 27 is a 0.6 mm-thick transparent substrate, 278 is a recording surface of an optical information recording medium having the 0.6 mm-thick transparent substrate, 28 is a 1.2 mm-thick transparent substrate, and 288 is a recording surface of an optical information recording medium having the 1.2 mm-thick transparent substrate. The figure shows how a light beam emerged from lens 16 and shown with solid lines is converged on recording surface 278 of an optical information recording medium having 0.6 mm-thick transparent substrate 27, and how a light beam shown with broken lines is converged on recording surface 288 of an optical information recording medium having 1.2 mm-thick transparent substrate 28.

Now the basis for entering the convergent light into objective lens 16 in this example and preferable conditions for an optical system composed of the objective lens 16 and the first lens group 13 will be explained as follows.

Numerical aperture of an objective lens, having a lateral magnification of m, of a finite conjugation type converted to parallel light incidence (hereinafter referred to as converted NA) which is symbolized as $NA^{\infty}$ can be expressed as follows.

$$NA^{\infty}=(1-m)\cdot NA \tag{1}$$

When this converted NA takes a large number, it causes difficulty in lens design and maintenance of capability, and it also makes an influence of environmental change such as temperature characteristics to be great. Therefore, in the case where NA in use on the image side is determined by an information recording medium for recording and/or reproducing, it is possible to make converted NA small and thereby to reduce refraction power assigned to an objective lens, by making m to be positive, namely by making convergent light to enter.

When wavefront aberration is made to be minimum and to be within Marechal criterion by convergent light incidence with an objective lens whose lateral magnification m is within a range of $$0.05 \leq m \tag{2}$$

deterioration of aberration caused by deviation of an optical axis of the first lens group from that of the objective lens can be reduced, resulting in a preferable structure as an optical system for recording and reproducing for an optical information medium.

By making an objective lens to be movable at least in the direction of an optical axis, a movable portion can be lightened and focusing can be done on a recording surface of an optical information medium with less amount of movement.

When NA is large, occurrence of spherical aberration caused by a change of distance between an object and an image and by a temperature change is increased. However, for overcoming this problem, it is possible to perform focusing by moving a light source and a first lens group in addition to the objective lens independently of each other in the same manner as in the objective lens, or by moving them integrally with the objective lens.

When Dco represents a distance between a surface of the first lens group 13 on the image side normalized with a focal length of an objective lens and a surface of the objective lens 16 on the light source side and f represents a focal length of the objective lens, it is preferable to satisfy the following conditions.

$$Dco/f \leq 5.0 \tag{3}$$

When the upper limit is exceeded, a size in the direction perpendicular to an optical axis of the first lens group is forced to be great.

In the conditional expression (2), the smaller a value of Dco/f is, the smaller an outside diameter of the first lens group can be. When performing focusing by moving objective lens 16 in its optical axis direction, however, it is preferable that the lower limit of the conditional expression (3) is made to satisfy the following.

$$0.1 \leq Dco/f \tag{4}$$

When this lower limit is exceeded, there comes a possibility that the objective lens 16 and the first lens group 13 interfere each other in the course of focusing.

When providing a bent-up mirror between the objective lens and the first lens group for the purpose of making the optical system compact, it is preferable for securing the space for the bent-up mirror that the lower limit satisfies the following conditions.

$$2.0 \leq Dco/f \tag{5}$$

An optical system satisfying aforesaid conditions can be used advantageously when a spot of diffraction limited performance is formed as an image on a recording surface of an optical information recording medium under the conditions of great NA and short wavelength of light used, and the optical system proves to be optimum when NA is not less than 0.48.

In the above occasion, it is preferable that the lateral magnification m of an individual objective lens further satisfies the following conditions.

$$0.05 \leq m \leq 0.23 \tag{6}$$

$$(1-m)\cdot NA \leq 0.65 \tag{7}$$

When the upper limit of the conditional expression (6) is exceeded, a size in the direction perpendicular to an optical axis of the coupling means grows greater, while, when the lower limit is exceeded, an error in the case of high NA, especially, spherical aberration caused by an error of a refractive index of the objective lens grows greater.

When the upper limit of conditional expression (7) is exceeded, a thickness of the objective lens increases. For ensuring its necessary working distance, therefore, it is necessary to increase the size of an overall optical system.

When the objective lens is made of resin, it is preferable that the lateral magnification m further satisfies the following condition.

$$0.05 \leq m \leq 0.125 \tag{8}$$

When the magnification exceeds the upper limit of conditional expression (8), occurrence of spherical aberration in the case of focusing by moving an objective lens in its optical axis direction increases under the condition of a change in a distance between an object and an image caused by a movement of an optical information medium or the like. When it exceeds the lower limit, an error in the case of high NA, especially, occurrence of spherical aberration caused by an error of a refractive index of the objective lens increases.

In the case of resin material, in particular, a refractive index is changed greatly by a change in temperature. In the case of resin, when the following expression is established under the assumption that $\Delta T$ represents a change in temperature, and $\Delta n$ represents a change in refractive index caused by the change in temperature.

$$\Delta n/\Delta T = \alpha \tag{9}$$

$\alpha$ is mostly constant and its value is negative for the range from 0° C. to almost 60° C. provided that the material remains the same.

Wavefront aberration (spherical aberration) change $\Delta WT$ corresponding to refractive index change $\Delta n$ is proportional to the fourth power of converted NA, and it is also proportional to focal length f and $\Delta n$, which results in the following expression;

$$\Delta WT = \beta \cdot (NA^-)^4 \cdot f \cdot \Delta n \tag{10}$$

wherein, $\beta$ represents a proportional coefficient.

Results of substituting expressions (1) and (9) for expression (10) are as follows.

$$\Delta WT = \{NA \cdot (1-m)\}^4 \cdot f \cdot \alpha \cdot \Delta T \tag{11}$$

It is understood from expression (11) that an influence of a change in temperature grows smaller corresponding to the fourth power of m when m is made to be positive.

By satisfying aforesaid conditional expression (8) and (7), therefore, it is possible to realize a compact optical system for recording and reproducing for an optical information recording medium by an objective lens made of resin which is light in weight and low in cost.

When the first lens group 13 is a system of one or more spherical lenses, the first lens group can be manufactured in the same method as that for conventional collimators.

However, the first lens group has a function to convert divergent light emitted from a light source into convergent light. Therefore, its refracting power is greater than that of a conventional collimator, and when it is needed to take in a large amount of light of a light source, NA at the light source side is needed to be larger. Therefore, with a spherical surface system only, the number of lenses to be used can not be small. For this reason, it is preferable that spherical aberration is corrected by employing at least one aspherical surface.

When an objective lens is made of resin, it is possible to reduce a change in spherical aberration caused by a change in refractive index corresponding to a change in temperature, by making convergent light to enter an objective lens. It is further possible to correct a change in spherical aberration of an overall optical system caused by a change in refractive index corresponding to a change in temperature by making at least one piece of lens constituting the first lens group and having positive refracting power to be made of resin.

In the foregoing, when a temperature rises by $\Delta T$ ($0 \leq \Delta T$), refractive index change $\Delta nc$ of the first lens group is negative ($\Delta nc \leq 0$). Therefore, refracting power of the first lens group is lowered, and convergence degree of a light beam emitted from the first lens group is smaller than that before temperature rise. Accordingly, lateral magnification m of the objective lens itself changes toward the smaller side ($\Delta m < 0$).

When $\Delta m$ is changed toward negative for magnification m which causes wavefront aberration of the objective lens to be minimum, the spherical aberration moves toward the under side. Refractive index change $\Delta n$ of the objective lens itself proves to be $\Delta n < 0$ because refractive index is lowered when temperature rises, and at this moment, the spherical aberration moves toward the over side.

Therefore, an influence on spherical aberration caused by a change in lateral magnification of an objective lens corresponding to a change in refractive index of the first lens group and an influence of a change in refractive index of the objective lens itself offset each other. Therefore, it is further possible to lessen an influence caused by temperature change by using a resin-made lens having positive refracting power as a first lens group.

Correction effect in the foregoing is greater compared with one in an occasion wherein at least one piece of collimator lens is a lens made of resin having positive refracting power in the constitution of a conventional collimator and an objective single lens made of resin. The reason for this is that even when NA at the light source side is the same as that of aforesaid collimator, converted NA of the first lens group grows greater because the first lens group has negative magnification, and an absolute value of magnification change $\Delta m$ of the objective lens itself grows greater accordingly.

In this case, it is preferable to use an aspherical surface in the first lens group, because NA at the light source side in the first lens group is great and yet the first lens group has a negative magnification.

When the first lens group is made to be a single aspherical lens made of resin, a lens which is inexpensive and has necessary functions can be obtained. From the image-forming magnification of the first lens group, it is preferable that at least one surface at the objective lens side is aspherical.

Further, when the lateral magnification mc of the first lens group further grows smaller, both surfaces are required to be aspherical when spherical aberration needs to be corrected properly. For this purpose, technologies of design and manufacture for a known objective lens of a finite conjugation type can be applied.

When causing convergent light to enter an objective single lens while satisfying conditional expression (2), it is possible to increase NA without increasing a lens thickness, and an influence of a change in refractive index or the like is made smaller. The reason for this is that $0 \leq m$ (convergent light incidence) makes converted NA small as shown in aforesaid expression (1).

When at least one surface of an objective single lens at the convergent light incidence side is made to be aspherical, it is possible to correct spherical aberration while satisfying a sine condition and to make wavefront aberration to be within Marechal criterion.

When wavefront aberration of an objective lens is made to be within Marechal criterion with convergent light incidence within a range of conditional expression (2) of lateral magnification m of the objective lens, the objective lens can maintain its performance independently. Therefore, combination with a means for converting divergent light emitted from a light source into convergent light is easy, and error sensitivity for arrangement including eccentricity is lowered.

When aforesaid objective lens is arranged so that its wavefront aberration may be limited within Marechal criterion by correcting aberration for a virtual light source, the objective lens becomes easy to be combined with a means for converting divergent light emitted from a light source into convergent light and thereby becomes a lens to be applied widely. Although the virtual light source is an imaginary one, it is practically equivalent to that its incident light beam is converged to one point at the diffraction limited spot.

It is possible to correct spherical aberration and offensive against sine condition by making both sides of an objective single lens to be aspherical. Therefore, it is possible to lessen occurrence of aberration even in the case of tracking conducted by moving an objective lens in the direction perpendicular to its optical axis, like an objective lens of an optical system for recording and reproducing for an optical information recording medium, for example.

It is preferable that an objective lens is a single lens, its both sides are aspherical, and the following conditions are satisfied;

$$-0.25 \leq f \cdot (n-1)/r_2 \leq 0.7 \quad (12)$$

wherein, f: focal length of the objective lens n: refractive index of material constituting the lens $r_2$: radius of curvature at apex on lens surface on the image side.

Further, it is preferable that the following conditions are satisfied;

$$-0.045 \leq X_2 \cdot (n-1)/\{f \cdot (NA)^2)\} \leq 0.1 \quad (13)$$

wherein,

NA: numerical aperture on image side of the objective lens $X_2$: distance in the optical axis direction between outermost point of an effective diameter of a ray of light on axis on lens surface at image side (position on surface at image side where peripheral ray of light of aforesaid NA enters) and an apex on the surface, and the direction of displacement toward an image for farther position from an optical axis is assumed to be positive.

Further, it is preferable that the following conditions are satisfied;

$$-0.005 \leq \Delta_2 \cdot (n-1)^3/\{f \cdot (NA)^4\} \leq 0.018 \quad (14)$$

wherein, $\Delta_2$: distance in the optical axis direction between an aspherical surface on outermost point of an effective diameter of a ray of light on axis on lens surface at image side (position on surface at image side where peripheral ray of light of aforesaid NA enters) and a reference spherical surface having radius of curvature $r_2$ at an apex on aforesaid surface, and the direction of displacement toward an image for farther position from an optical axis is assumed to be positive.

When the refracting power of an objective single lens at the image side is negative and strong exceeding the upper limit of conditional expression (12), an amount of negative spherical aberration on the surface on the convergent light incidence side grows greater and an amount of aspherical surface on the convergent light incidence side grows greater, resulting in a lens which is difficult to be manufactured. When the refracting power of an objective single lens at the image side is positive and strong exceeding the lower limit, negative spherical aberration on the surface at the image side becomes great and an amount of aspherical surface on the convergent light incidence side becomes great, resulting in a lens which is difficult to be manufactured.

In order to correct spherical aberration and offense against sine condition when the upper limit of conditional expression (13) is exceeded, the surface at the image side also needs to be aspherical, and an amount of aspherical surface grows greater on both sides, resulting in a lens which is difficult to be manufactured. In order to correct spherical aberration and offense against sine condition when the lower limit is exceeded, the surface at the image side also needs to be aspherical, and an amount of aspherical surface grows greater on both sides, resulting in a lens which is difficult to be manufactured.

When the upper limit of conditional expression (14) is exceeded, the offense against sine condition is over-corrected, and when the lower limit thereof is exceeded, the offense against sine condition is under-corrected.

Next, the invention will be explained as follows.

The invention has been achieved for the purpose of using the same optical system for recording and/or reproducing of optical information recording media including high density optical disk having a 0.6 mm-thick transparent substrate (digital video disk and DVD) and conventional optical disk having a 1.2 mm-thick transparent substrate (compact disk and CD etc.). In the case of a conventional CD, a wavelength of a laser light source has been 0.78 µm and a necessary numerical aperture on the optical information recording medium side of an objective lens has been about 0.45. For DVD applications, a wavelength is shorter and aforesaid necessary numerical aperture is larger, both for compliance with high density. To be concrete, the wavelength is 0.635 µm–0.65 µm and the necessary numerical aperture is about 0.6. Since the same optical system is used for both DVD and CD in the invention as stated above, a short wavelength laser which is the same as that for DVD is to be used also for CD. In this case, it is known that a light spot size, a wavelength and a numerical aperture are in the relation of the following expression.

Light spot size ∝ wavelength/numerical aperture

Therefore, in the case of a light source with a wavelength of about 0.635–0.65 µm, a numerical aperture of about 0.37 is enough for CD application.

Examples 5–9 of an optical system for an optical disk (optical information recording medium) for recording and/or reproducing optical information will be explained in comparison with conventional ones as follows.

In both the prior art and Example 5, optimum design of a collimator lens can make a collimated light which is mostly free from aberration to enter an objective lens, though no data of the collimator lens are described.

Further, numerical data described in the prior arts and Examples 5–9 are all for substrate thickness t1 of 0.6 mm. Transparent substrate thickness t2 of the second optical information recording medium in both the prior arts and Examples 5–9 is 1.20 mm.

Next, the prior arts are shown in Tables 1 and 2.

PRIOR ARTS

Focal length f=3.40 mm, numerical aperture on optical information recording medium side NA1=0.60, NA2=0.37, magnification m=0, light source wavelength λ=635 nm

TABLE 1

| i | ri | di | ni |
|---|------|------|---------|
| 1 | 2.062 | 2.60 | 1.49005 |
| 2 | −5.078 | 1.61 | |
| 3 | ∞ | 0.60 | 1.58000 |
| 4 | ∞ | | |

TABLE 2

| | |
|---|---|
| First surface | K = −8.39620 × 10$^{-1}$ |
| | A4 = 4.45590 × 10$^{-3}$ |
| | A6 = 2.38400 × 10$^{-4}$ |
| | A8 = 6.65960 × 10$^{-6}$ |
| | A10 = −7.79950 × 10$^{-6}$ |
| Second surface | K = −1.76960 × 10 |
| | A4 = 9.96800 × 10$^{-3}$ |
| | A6 = −4.44370 × 10$^{-3}$ |
| | A8 = 9.26520 × 10$^{-4}$ |
| | A10 = −8.12840 × 10$^{-5}$ |

Next, Example 5 will be shown in Tables 3 and 4. Incidentally, each of FIGS. 15(a) and 15(b) is a sectional view of an optical system of an objective lens and a substrate in Example 5 of the invention, and FIG. 15(a) is a sectional view of the optical system wherein a substrate thickness is t1, while FIG. 15(b) is that of the optical system wherein a substrate thickness is t2. In the figure, A represents an aperture-stop.

EXAMPLE 5

Focal length f=3.40 mm, numerical aperture on optical information recording medium side NA1=0.60, NA2=0.37, magnification m=0, light source wavelength λ=635 nm

TABLE 3

| i | ri | di | ni |
|---|------|------|---------|
| 1 | 2.035 | 2.60 | 1.49005 |
| 2 | −5.334 | 1.59 | |
| 3 | ∞ | 0.60 | 1.58000 |
| 4 | ∞ | | |

TABLE 4

| | |
|---|---|
| First surface | K = −6.05080 × 10$^{-1}$ |
| | A3 = −2.48170 × 10$^{-3}$ |
| | A4 = 5.07650 × 10$^{-3}$ |
| | A5 = −1.52780 × 10$^{-3}$ |
| | A6 = 2.20960 × 10$^{-4}$ |
| | A8 = −1.75480 × 10$^{-5}$ |
| | A10 = 1.28240 × 10$^{-6}$ |
| Second surface | K = −2.25580 × 10 |
| | A3 = −1.49780 × 10$^{-3}$ |
| | A4 = 1.23500 × 10$^{-2}$ |
| | A5 = −1.21530 × 10$^{-3}$ |
| | A6 = −3.52540 × 10$^{-3}$ |
| | A8 = 1.21430 × 10$^{-3}$ |
| | A10 = −1.53200 × 10$^{-4}$ |

Next, Example 6 will be shown in Tables 5 and 6. Incidentally, each of FIGS. 16(a) and 16(b) is a sectional view of an optical system of a collimator lens, an objective lens and a substrate in Example 6 of the invention, and FIG. 16(a) is a sectional view of the optical system wherein a substrate thickness is t1, while FIG. 16(b) is that of the optical system wherein a substrate thickness is t2. In the figure, A represents an aperture-stop.

EXAMPLE 6

Focal length of a collimator lens fc=23.8, magnification of total optical system mT=−1/7, focal length of objective lens $f_0$=3.40, magnification of objective lens $m_0$=0, numerical aperture on the optical information recording medium side NA1=0.60, NA2=0.37, light source wavelength λ=635 nm

TABLE 5

| i | ri | di | ni |
|---|--------|------|---------|
| 1 | 92.531 | 1.70 | 1.49005 |
| 2 | −13.265 | 5.00 | |
| 3 | 2.062 | 2.60 | 1.49005 |
| 4 | −5.078 | 1.61 | |
| 5 | ∞ | 0.60 | 1.58000 |
| 6 | ∞ | | |

TABLE 6

| | |
|---|---|
| Second surface | K = −4.61390 × 10$^{-1}$ |
| | A3 = 2.34030 × 10$^{-3}$ |
| | A4 = −3.91420 × 10$^{-3}$ |
| | A5 = 2.08740 × 10$^{-3}$ |
| | A6 = −2.41720 × 10$^{-4}$ |
| | A8 = −4.54100 × 10$^{-5}$ |
| | A10 = 4.60800 × 10$^{-6}$ |
| Third surface | K = −8.39620 × 10$^{-1}$ |
| | A4 = 4.45590 × 10$^{-3}$ |
| | A6 = 2.38400 × 10$^{-4}$ |
| | A8 = 6.65960 × 10$^{-6}$ |
| | A10 = −7.79950 × 10$^{-6}$ |
| Fourth surface | K = −1.76960 × 10 |
| | A4 = 9.96800 × 10$^{-3}$ |
| | A6 = −4.44370 × 10$^{-3}$ |
| | A8 = 9.26520 × 10$^{-4}$ |
| | A10 = −8.12840 × 10$^{-5}$ |

Next, Example 7 will be shown in Tables 7 and 8. Incidentally, each of FIGS. 17(a) and 17(b) is a sectional view of an optical system of a coupling lens, an objective lens and a substrate in Example 7 of the invention, and FIG. 17(a) is a sectional view of the optical system wherein a substrate thickness is t1, while FIG. 17(b) is that of the optical system wherein a substrate thickness is t2. In the figure, A represents an aperture-stop. An optical system wherein convergent light enters the third surface of an objective lens as shown in FIG. 17(a) is assumed to be a light converging optical system.

EXAMPLE 7

Focal length of a coupling lens $f_c$32 16.0, magnification of total optical system $m_T$=−1/7, focal length of objective lens $f_0$=3.40, magnification of objective lens $m_0$=+1/12, numerical aperature on the optical information recording medium side NA1=0.60, NA2=0.37, light source wavelength λ=635 nm.

TABLE 7

| i | ri | di | ni |
|---|--------|------|---------|
| 1 | 20.437 | 2.00 | 1.49005 |
| 2 | −12.283 | 5.00 | |
| 3 | 1.949 | 2.60 | 1.49005 |
| 4 | −6.451 | 1.24 | |
| 5 | ∞ | 0.60 | 1.58000 |
| 6 | ∞ | | |

TABLE 8

| | |
|---|---|
| First surface | K = −4.50630 × 1 |
| Second surface | K = −8.00940 × 10⁻¹ |
| | A4 = 3.45000 × 10⁻⁵ |
| Third surface | K = −7.50000 × 10⁻¹ |
| | A3 = −2.54580 × 10⁻³ |
| | A4 = 9.57880 × 10⁻³ |
| | A5 = −9.29620 × 10⁻⁴ |
| | A6 = −3.46080 × 10⁻⁴ |
| | A8 = 3.44700 × 10⁻⁴ |
| | A10 = −2.24010 × 10⁻⁵ |
| Fourth surface | K = −2.25760 × 10 |
| | A3 = 9.19680 × 10⁻⁴ |
| | A4 = 2.21350 × 10⁻² |
| | A5 = −5.19430 × 10⁻³ |
| | A6 = −3.79960 × 10⁻³ |
| | A8 = 1.25590 × 10⁻³ |
| | A10 = −2.25790 × 10⁻⁴ |

Next, Example 8 will be shown in Tables 9 and 10. Incidentally, each of FIGS. 18(a) and 18(b) is a sectional view of an optical system of an objective lens and a substrate in Example 8 of the invention, and FIG. 18(a) is a sectional view of the optical system wherein a substrate thickness is t1, while FIG. 18(b) is that of the optical system wherein a substrate thickness is t2. In the figure, A represents an aperture-stop.

EXAMPLE 8

Focal length f=3.40, magnification m=−⅕, numerical aperture on the optical information recording medium side NA1=0.60, NA2=0.37, light source wavelength λ=635 nm

TABLE 9

| i | ri | di | ni |
|---|---|---|---|
| 1 | 2.418 | 2.60 | 1.58701 |
| 2 | −6.882 | 2.15 | |
| 3 | ∞ | 0.60 | 1.58000 |
| 4 | ∞ | | |

TABLE 10

| | |
|---|---|
| First surface | K = −5.07215 × 10⁻¹ |
| | A3 = −1.42759 × 10⁻³ |
| | A4 = 5.34297 × 10⁻⁴ |
| | A5 = −3.89938 × 10⁻⁷ |
| | A6 = −3.79877 × 10⁻⁴ |
| | A8 = −9.17427 × 10⁻⁶ |
| | A10 = 9.75781 × 10⁻⁶ |
| Second surface | K = −2.28834 × 10 |
| | A3 = −1.31434 × 10⁻³ |
| | A4 = 7.66401 × 10⁻³ |
| | A5 = 4.68086 × 10⁻⁵ |
| | A6 = −2.64211 × 10⁻³ |
| | A8 = 7.87643 × 10⁻⁴ |
| | A10 = −6.88801 × 10⁻⁵ |

Next, Example 9 will be shown in Tables 11 and 12. Incidentally, each of FIGS. 19(a) and 19(b) is a sectional view of an optical system of an optical element for aberration correction, an objective lens and a substrate in Example 9 of the invention, and FIG. 19(a) is a sectional view of the optical system wherein a substrate thickness is t1, while FIG. 19(b) is that of the optical system wherein a substrate thickness is t2. In the figure, A represents an aperture-stop.

EXAMPLE 9

Focal length of objective lens f=3.40, magnification of objective lens m=0, numerical aperture on the optical information recording medium side NA1=0.60, NA2=0.37, light source wavelength λ=635 nm

TABLE 11

| i | ri | di | ni |
|---|---|---|---|
| 1 | ∞ | 1.00 | 1.49005 |
| 2 | ∞ | 1.00 | |
| 3 | 2.062 | 2.60 | 1.49005 |
| 4 | −5.078 | 1.61 | |
| 5 | ∞ | 0.60 | 1.58000 |
| 6 | ∞ | | |

TABLE 12

| | |
|---|---|
| First surface | K = 0.0 |
| | A3 = −3.08265 × 10⁻⁴ |
| | A4 = −1.93069 × 10⁻³ |
| | A5 = 4.12143 × 10⁻³ |
| | A6 = −2.29694 × 10⁻³ |
| | A8 = 2.51949 × 10⁻⁴ |
| | A10 = −1.58482 × 10⁻⁵ |
| Third surface | K = −8.39620 × 10⁻¹ |
| | A4 = 4.45590 × 10⁻³ |
| | A6 = 2.38400 × 10⁻⁴ |
| | A8 = 6.65960 × 10⁻⁶ |
| | A10 = −7.79950 × 10⁻⁶ |
| Fourth surface | K = −1.76960 × 10 |
| | A4 = 9.96800 × 10⁻³ |
| | A6 = 4.44370 × 10⁻³ |
| | A8 = 9.26520 × 10⁻⁴ |
| | A10 = −8.12840 × 10⁻⁵ |

FIG. 20(a) shows a spherical aberration diagram of a prior art for substrate thickness of t1=0.6 mm and FIG. 20(b) shows that for substrate thickness of t2=1.2 mm. FIGS. 21(a)–25(a) represent spherical aberration diagrams in Examples 5–9 wherein substrate thickness t1 is 0.6 mm, while FIGS. 21(b)–25(b) represent spherical aberration diagrams in Examples 5–9 wherein substrate thickness t2 is 1.2 mm.

In the spherical aberration diagrams wherein a substrate thickness is t1, it is understood that over-correction is observed at a height near (½)NA2 and correction is almost perfect at a height near NA2 both in the invention, while correction is perfect in a prior art. In the spherical aberration curve, under-correction is observed in a height range from (½)NA2 to NA2.

In the spherical aberration diagrams wherein a substrate thickness is t2, a prior art has an extremely great spherical aberration caused by over spherical aberration generated when a substrate is thick because perfect correction has been done for substrate thickness t1 in the prior art. In the present example, a light beam at the height of (½) NA2 is more excessively corrected than that at the height of NA2 for substrate thickness t1, and therefore, the light beam at the height of NA2 is more under than that at the height of (½)NA2 in terms of correction, thus, over spherical aberration caused by greater substrate thickness can be reduced.

Further, in the case of a CD system with an optical disk having substrate thickness t2 of 1.2 mm, λ/NA=1.73 (wherein, λ represents light source wavelength (μm) and NA represents a numerical aperture on the optical information recording medium side) can provide sufficient recording and/or reproducing capability. When λ is 0.78 μm, NA is 0.45 and when λ is 0.635 μm, NA is about 0.37.

Accordingly, for recording and/or reproducing in the case of substrate thickness of t2, it is possible to remove great spherical aberration generated between NA1 and NA2 by inserting an aperture-stop of NA2 (when λ is 0.635 μm, NA is about 0.37) in an optical path, and excellent efficiency can be obtained accordingly. However, even when a light beam of full-open NA1 is caused to pass without using an aperture-stop equivalent to aforesaid NA2, a light beam greater than NA2 has great spherical aberration and thereby it becomes flare light. Therefore, it is possible to obtain an excellent image forming spot by selecting an optimum focus position (best defocus position) through moving of an objective lens on an optical axis.

Spot forms in the case of the best defocus (respectively, 0 μm) through substrate thickness t1 respectively in a prior art and Example 5 of the invention are shown in FIG. 26 and FIG. 27. In the prior art, spherical aberration is corrected completely through substrate thickness t1 and an excellent image forming spot can therefore be obtained. Even in the case of an optical system wherein spherical aberration at the height of (½) NA2 is over-corrected in the invention, an excellent image forming spot that is equal to that in the prior art can also be obtained.

Spot forms in the case of the defocus amount of about 9 μm through substrate thickness t2 respectively in a prior art and Example 5 of the invention are shown in FIG. 28 and FIG. 29. In either case, when the defocus amount is set at about 9 μm, a light beam for an area of greater NA is converged further behind the information recording surface and it turns into a flare light, thus, it is possible to reduce an effect on an image forming spot. Further, when spherical aberration of a light beam at the height near (½) NA2 through substrate thickness of t1 is over-corrected as in the invention, and when the spherical aberration curve for the height range from (½) NA2 to NA2 is under-corrected, it is possible to reduce the extent that the spherical aberration through substrate thickness of t2 for an area under NA2 becomes over, and thereby it is further possible to obtain the image forming spot which is better than that in the prior art. In a spot form, a side lobe generated in the example of the invention is extremely small compared with that generated in the prior art, and an excellent image forming spot which is not problematic at all in practical use can be obtained.

The present invention makes it possible for a single optical pickup apparatus to conduct recording and/or reproducing of optical information recording media having different types of substrate thickness, and thereby makes it possible, in particular, to provide a simply-structured and compact optical system for recording and/or reproducing optical information recording media.

What is claimed is:

1. An optical pickup apparatus comprising:
    (a) a laser light source;
    (b) a light converging optical system for converging a light beam emitted from the laser light source onto a first information recording surface of a first optical information recording medium having a thickness t1 of a transparent substrate, or a second information recording surface of a second optical information recording medium having a thickness t2 of a transparent substrate,
    wherein the light converging optical system has a best fit wavefront aberration of 0.07 λ rms or less at a numerical aperture of NA1 through the thickness t1 of the transparent substrate, and has a best fit wavefront aberration of 0.07 λ rms or less at a numerical aperture of NA2 through the thickness t2 of the transparent substrate, where NA1 represents a numerical aperture on a side of the first optical information recording medium in the light converging optical system when the light beam emitted from the laser light source is converged as a light spot to be read out, NA2 represents an effective numerical aperture on a side of the second optical information recording medium in the light converging optical system when the light beam emitted from the laser light source is converged as a light spot to be read out, and λ represents a wavelength of the light beam emergent from the laser light source; and
    (c) a light detector for detecting light reflected from the first or second information recording surface.

2. The optical pickup apparatus of claim 1, wherein the following expression is satisfied,

NA1>NA2.

3. The optical pickup apparatus of claim 1, wherein the light converging optical system has a best fit wavefront aberration of 0.05 λ rms or less at a numerical aperture of NA1 when the thickness t1 of the transparent substrate is used.

4. The optical pickup apparatus of claim 1, wherein the light converging optical system has a best fit wavefront aberration of 0.05 λ rms or less at a numerical aperture of NA2 when the thickness t2 of the transparent substrate is used.

5. The optical pickup apparatus of claim 1, wherein the following expressions are satisfied, t1=0.6 mm, t2=1.2 mm, $\lambda/1.14 \leq NA1$, $\lambda/1.75 \leq NA2$.

6. The optical pickup apparatus of claim 1, wherein the following expressions are satisfied, t1=0.6 mm, t2=1.2 mm, $\lambda/1.14 \leq NA1$, $\lambda/2.46 \leq NA2$.

7. The optical pickup apparatus of claim 1, wherein the light converging optical system comprises a finite conjugate type objective lens.

8. The optical pickup apparatus of claim 1, wherein the light converging optical system comprises an infinite conjugate type objective lens and a collimator lens.

9. The optical pickup apparatus of claim 1, wherein the light converging optical system comprises a converging conjugate type objective lens.

10. The optical pickup apparatus of claim 1 further comprising a focusing control means for controlling a focusing so that the light converging optical system focuses on a point farther than a paraxial focus from a focal point, when the light converging optical system converges the light beam emergent from the laser light source on the second information recording surface as a spot to read out.

11. The optical pickup apparatus of claim 1 further comprising a masking member provided in an optical path between the laser light source and the light detector through the light converging optical system, for masking a part of light beam passing between the numerical apertures of NA1 and NA2.

12. The optical pickup apparatus of claim 11, wherein the masking member is a ring-shaped member.

13. The optical pickup apparatus of claim 11, wherein the masking member is a ring-shaped member, a part of which is eliminated.

14. The optical pickup apparatus of claim 11, wherein the light converging optical system comprises an objective lens, and the masking member is formed on a surface of the objective lens on a laser light source side.

15. The optical pickup apparatus of claim 11, wherein the light converging optical system comprises a beam splitter for orienting a reflected light from the first or second information recording surface toward the light detector, and the masking member is disposed between the beam splitter and the light detector.

16. The optical pickup apparatus of claim 11, wherein NA2 is $\lambda/1.75$ μm.

17. The optical pickup apparatus of claim 11, wherein NA2 is $\lambda/2.46$ μm.

18. The optical pickup apparatus of claim 11, wherein light beam passing between 1.05·NA2 and 1.20 NA2 is masked by an outer edge of the masking member.

19. The optical pickup apparatus of claim 1, wherein the light detector is divided into a plurality of information signal generating areas in which the areas are different from each other according to the first or second optical information recording medium.

20. The optical pickup apparatus of claim 19, wherein the plurality of information signal generating areas are divided into an outer and inner sides, and when the light beam emergent from the laser light source is converged on the second information recording surface as a spot to read out, the inner side of the information signal generating area is selected.

21. The optical pickup apparatus of claim 1, wherein a spherical aberration of the light converging optical system through the thickness t1 of the transparent substrate is over-corrected in a in (½)NA2 than that in NA2.

22. The optical pickup apparatus of claim 1, wherein the light converging optical system has a wavefront aberration in which interference fringes having a V-shaped bending portion is observed at a portion corresponding to a numerical aperture between ½·NA2 and NA1, when the light spot in the state of light converging, is observed by an interferometer so that the interference fringes are arranged in a straight line.

23. The optical pickup apparatus of claim 1, wherein the light converging optical system comprises an optical element for correcting an aberration of the light converging optical system.

24. An objective lens for use in an optical pickup apparatus for converging a light beam emergent from a laser light source onto a first information recording surface of a first optical information recording medium having a thickness t1 of a transparent substrate, or a second information recording surface of a second optical information recording medium having a thickness t2 of a transparent substrate, the objective lens comprising:

(a) a first surface; and (b) a second surface opposite the first surface, wherein the objective lens has a best fit wavefront aberration of 0.07 λ rms or less at a numerical aperture of NA1 through the thickness t1 of the transparent substrate, and has a best fit wavefront aberration of 0.07 λ rms or less at a numerical aperture of NA2 through the thickness t2 of the transparent substrate, where NA1 represents a numerical aperture on a side of the first optical information recording medium in the light converging optical system when the light beam emitted from the laser light source is converged as a light spot to be read out, NA2 represents an effective numerical aperture on a side of the second optical information recording medium in the light converging optical system when the light beam emitted from the laser light source is converged as a light spot to be read out, and λ represents a wavelength of the emergent from the laser light source.

25. The objective lens of claim 24, wherein the following expression is satisfied, $$NA1 > NA2.$$

26. The objective lens of claim 24, wherein the best fit wavefront aberration at NA1 is 0.05 λ rms or less.

27. The objective lens of claim 24, wherein the best fit wavefront aberration at NA2 is 0.05 λ rms or less.

28. The objective lens of claim 24, wherein the following expressions are satisfied, $$t1=0.6 \text{ mm}, t2=1.2 \text{ mm},$$

$$\lambda/1.14 \leq NA1,$$

$$\lambda/1.75 \leq NA2.$$

29. The objective lens of claim 24, wherein the following expressions are satisfied, $$t1=0.6 \text{ mm}, t2=1.2 \text{ mm},$$

$$\lambda/1.14 \leq NA1,$$

$$\lambda/2.46 \leq NA2.$$

30. The objective lens of claim 24, wherein the objective lens is a finite conjugate type.

31. The objective lens of claim 24, wherein the objective lens is an infinite conjugate type.

32. The objective lens of claim 24, wherein the objective lens is a converging conjugate type.

33. The objective lens of claim 24, wherein a spherical aberration of the objective lens is over-corrected in a in (½)NA2 than that in NA2.

34. The objective lens of claim 24, wherein the objective lens has a wavefront aberration in which interference fringes having a V-shaped bending portion is observed at a portion corresponding to a numerical aperture between ½·NA2 and NA1, when the light spot in the state of light converging, is observed by an interferometer so that the interference fringes are arranged in a straight line.

35. The objective lens of claim 24 further comprising a masking member provided on one surface of the objective lens, for masking a part of light beam passing between the numerical apertures of NA1 and NA2.

36. The objective lens of claim 35, wherein the masking member is a ring-shaped member.

37. The objective lens of claim 35, wherein the masking member is a ring-shaped member, a part of which is eliminated.

* * * * *